United States Patent
Keith et al.

(10) Patent No.: US 11,991,177 B2
(45) Date of Patent: May 21, 2024

(54) NODE SECURITY WITH INTERMEDIATE DEVICES

(71) Applicant: Citrix Systems, Inc., Fort Lauderdale, FL (US)

(72) Inventors: Seth K. Keith, Scotts Valley, CA (US); Saravanakumar Annamalaisami, Pleasanton, CA (US); Krishna Khanal, San Jose, CA (US); Ratnesh Singh Thakur, San Jose, CA (US)

(*) Notice: Subject to any disclaimer, the term of this patent is extended or adjusted under 35 U.S.C. 154(b) by 320 days.

(21) Appl. No.: 17/340,494

(22) Filed: Jun. 7, 2021

(65) Prior Publication Data

US 2022/0394034 A1 Dec. 8, 2022

(51) Int. Cl.
*H04L 29/06* (2006.01)
*G06F 9/54* (2006.01)
*H04L 9/40* (2022.01)

(52) U.S. Cl.
CPC .............. *H04L 63/10* (2013.01); *G06F 9/547* (2013.01); *H04L 63/1408* (2013.01)

(58) Field of Classification Search
CPC . H04L 63/10; H04L 63/1408; H04L 63/1441; G06F 9/547
USPC ............................................................ 726/4
See application file for complete search history.

(56) References Cited

U.S. PATENT DOCUMENTS

| 2007/0147239 | A1 | 6/2007 | Wu et al. | |
|---|---|---|---|---|
| 2015/0150130 | A1* | 5/2015 | Fiala | G06F 21/56 726/23 |
| 2022/0092048 | A1* | 3/2022 | Ke | G06F 16/2308 |

FOREIGN PATENT DOCUMENTS

| CN | 103095785 B | 5/2013 |
|---|---|---|
| WO | WO-2020/088379 A1 | 5/2020 |

OTHER PUBLICATIONS

Backer, S., et al. "Will gRPC Be the Next Protocol to Slip By Your Defense", Jun. 5, 2020, https://www.f5.com/labs/articles/education/will-grpc-be-the-next-protocol-to-slip-by-your-defenses; downloaded from internet May 27, 2021.
Fedorov, Mikhail, "Protecting gRPC based APIs with NGINX App Protect", https://devcentral.f5.com/s/articles/Protecting-gRPC-based-APIs-with-NGINX-App-Protect; posted Mar. 29, 2021.
https://www.envoyproxy.io/docs/envoy/latest/intro/arch_overview/other_protocols/grpc.
https://www.envoyproxy.io/docs/envoy/latest/start/sandboxes/grpc_bridge.
International Search Report and Written Opinion on PCT Appl. No. PCT/US2022/031940 dated Sep. 19, 2022.

* cited by examiner

*Primary Examiner* — Tu T Nguyen

(57) ABSTRACT

Reducing vulnerability to a server is provided. A device intermediary to a client and a server can receive a RPC message from the RPC based client to the RPC based server, the RPC message having a plurality of fields to execute one or more routines on the server. The device can detect that one or more fields of the plurality of fields exploits a vulnerability of the RPC based server. The device can modify the RPC message to remove the one or more fields from the RPC message. The device can forward the modified RPC message to the RPC server.

20 Claims, 7 Drawing Sheets

NODE SECURITY WITH INTERMEDIATE DEVICES

FIELD OF THE DISCLOSURE

This application generally relates to data communication networks, including but not limited to systems and methods for reducing vulnerability to nodes of a computing system or environment.

BACKGROUND

Client devices can establish communication channels or paths with servers or other remote devices. Client devices can communicate with servers using a messaging protocol. Clients can transmit messages to servers via an application executing on the clients or the servers. Clients can transmit the messages to access or retrieve resources from servers.

BRIEF SUMMARY

Clients may transmit messages with malicious content that disrupts or otherwise negatively impacts the performance of the server or services provided by the server. Client devices can transmit messages to servers via protocols (e.g., a Remote Procedure Call ("RPC") protocol). For example, the RPC can be a gRPC protocol. The client devices can be gRPC clients and servers can be gRPC servers. The gRPC protocol can be compatible with different programming languages, which can facilitate communication and interconnection of different applications or micro applications. However, a server that is configured to process gRPC protocol messages can be vulnerable to an attack. For example, a malicious user or attacker can exploit a vulnerability of a server by using a gRPC protocol buffer, as described further below.

One type of vulnerability exposed by the gRPC protocol relates to duplicate fields in a gRPC message. A server that is that is configured to process gRPC protocol messages can accept a message with duplicate fields. To do so, the server can scan the entire message to identify all duplicate fields, and then either select the values for the last duplicate field or concatenate the values in the duplicate fields. The gRPC requirement to scan for the last duplicate before validating constitutes a denial of service vulnerability. Further, to provide backwards compatibility for gRPC, the server can accept messages with unknown field numbers or values, which can expose the server to injection attacks.

The server that processes gRPC protocol message (e.g., a gRPC server) can provide flexibility of field order or accept fields in any order, which could expose the servers to stacking of optional fields or data before or after necessary fields for performing routines of the servers. With flexible field order, there may be hidden fields (e.g., data which may be transparent to or may not be modified by the client) placed contiguously to valid data in memory or in the messages, containing malicious content, which would avoid validation and could be placed contiguously in memory with valid fields. The gRPC protocol also lacks range checking and string content validation, imposing the server to accept max size values for all parameters. Additionally, the message may include hidden data which can include data not validated by libraries of the server (e.g., gRPC libraries). In this case, the hidden data can an injection attack or other dangerous content physically contiguous to a valid input parameter strings in a message. Accordingly, the servers can be prone to attacks when receiving messages from clients or other devices using the gRPC protocol.

The systems and methods of this technical solution can include an intermediary device (sometimes referred to generally as a device), such as an inline proxy or a virtual proxy cloud service, in the transaction path (e.g., gRPC transaction path) to process data or messages between clients and servers. The device can scan messages in real-time to mitigate server vulnerabilities, for example, by detecting and removing redundant or unwanted fields, as well as validating field content for known vulnerabilities. For example, the device can perform data validation for custom range, value, and type options, among other parameter range checking specified by the administrator of the device or the server. The parameter range checking can be annotated in a .proto file (e.g., proto file or configuration file). The device can determine whether the fields in messages from the transaction path are described in the configuration file (e.g., proto file definition) to remove attack vectors (e.g., malicious code, such as viruses or worms) and undesired or objectionable hidden data in messages.

The device can remove, eliminate or reduce the unnecessary or redundant fields from the message. By reducing the unnecessary or redundant data in the message, the device can reduce the amount of computational resources (e.g., processor or memory) utilized by the server, thereby increasing the throughput or performance of the server while reducing latency associated with resource or services provided by the server. The device can prevent the server from being overloaded by unknown or redundant (e.g., duplicate) fields. The device can perform range checking on strings (e.g., field type) or repeated fields to prevent overloading on the server. The device can modify non-compliant field values (e.g., field sizes or field values that are out of range) by updating the conflicting values, thereby validating unknown fields. Thus, by leveraging the device intermediary to clients and servers to process intercept, and process messages in the transaction path between endpoints, the systems and methods described herein can at least improve the security of endpoints, reduce vulnerabilities to servers, increase server performance, and reduce server latency (e.g., reducing loads to the server).

In one aspect, this disclosure is directed to a method for improving server performance. The method can include receiving, by a device intermediary to a client and a server, a message from the client with a plurality of fields to execute one or more routines on the server remote from the client. The method can include identifying, by the device, duplicate fields in the plurality of fields that reduce server performance. The method can include modifying, by the device instead of the server, the plurality of fields of the message to improve the server performance based at least on the identification of the duplicate fields. The method can include forwarding, by the device, the modified message to the server.

In some implementations, the duplicate fields in the plurality of fields can be indicative of an attack on the server that reduces the server performance. The method can include modifying, by the device based at least on a type of field, a value of the field to a concatenation of values of the duplicate fields. The method can include modifying, by the device based at least on a type of field, a value of the field to a value of a last duplicated field in the message. The method can include removing, by the device, a field of the plurality of fields and a corresponding value of the field based on the value of the field exceeding a range established for a type of field corresponding to the field. The method can include receiving, by the device, a configuration file used by the server to process the message. The method can include modifying, by the device, the message in accordance with the configuration file prior to forwarding the message to the server. In some implementations, the message can correspond to a gRPC protocol, the client is a gRPC client, and the server is a gRPC server.

In another aspect, this disclosure is directed to a system for improving server performance. The system can include a device intermediary to a client and a server. The device can receive a message from the client with a plurality of fields to execute one or more routines on the server remote from the client. The device can identify duplicate fields in the plurality of fields that reduce server performance. The device can modify, instead of the server, the plurality of fields of the message to improve the server performance based at least on the identification and removal or concatenation of the duplicate fields, and removal of non-pertinent (non-desired) fields. The device can forward the modified message to the server.

In some implementations, the duplicate fields in the plurality of fields can be indicative of an attack on the server that reduces the server performance. The device can modify, based at least on a type of field, a value of the field to a concatenation of values of the duplicate fields. The device can modify, based at least on a type of field, a value of the field to a value of a last duplicated field in the message. The device can remove a field of the plurality of fields and a corresponding value of the field based on the value of the field exceeding a range established for a type of field corresponding to the field. The device can receive a configuration file used by the server to process the message. The device can modify the message in accordance with the configuration file prior to forwarding the message to the server. In some implementations, the message can correspond to a gRPC protocol, the client is a gRPC client, and the server is a gRPC server.

In one aspect, this disclosure is directed to a method for reducing vulnerability to a server. The method can include receiving, by a device intermediary to a client and a server, a message from the client with a plurality of fields to execute one or more routines on the server. The method can include detecting, by the device, a field of the plurality of fields that exploits a vulnerability of the server. The method can include modifying, by the device instead of the server and responsive to the detection, the message to remove the field to enable reduction of the vulnerability to the server. The method can include forwarding, by the device, the modified message to the server.

In some implementations, the method can include detecting, by the device, that the field exposes the vulnerability in accordance with an RPC protocol used by the server. The method can include detecting, by the device, that the field is unknown in accordance with the RPC protocol used by the server. In some implementations, the method can include detecting, by the device, that the field is unacceptable by one of the device or the server. The method can include forwarding, by the device to the server, the message with all fields that are objectionable removed. The method can include detecting, by the device, the field is invalid based on a non-conformance with a configuration file used by the server to process the message. In some implementations, the RPC protocol can be a gRPC, the client can be a gRPC client, and the server can be a gRPC server.

In another aspect, this disclosure is directed to a system for reducing vulnerability to a server. The system can include a device intermediary to a client and a server. The device can receive a message from the client with a plurality of fields to execute one or more routines on the server. The device can detect a field of the plurality of fields that exploits a vulnerability of the server. The device can modify, instead of the server and responsive to the detection, the message to remove the field to enable reduction of the vulnerability to the server. The device can forward the modified message to the server.

In some implementations, the device can detect that the field exposes the vulnerability in accordance with an RPC protocol used by the server. The device can detect that the field is unknown in accordance with the RPC protocol used by the server. In some implementations, the device can detect that the field is unacceptable by one of the device or the server. The device can forward, to the server, the message with all fields that are objectionable removed. The device can detect the field is invalid based on a non-conformance with a configuration file used by the server to process the message. In some implementations, the RPC protocol can be a gRPC, the client can be a gRPC client, and the server can be a gRPC server.

These and other aspects and implementations are discussed in detail below. The foregoing information and the following detailed description include illustrative examples of various aspects and implementations, and provide an overview or framework for understanding the nature and character of the claimed aspects and implementations.

BRIEF DESCRIPTION OF THE FIGURES

The foregoing and other objects, aspects, features, and advantages of the present solution will become more apparent and better understood by referring to the following description taken in conjunction with the accompanying drawings, in which.

Figure 1A:
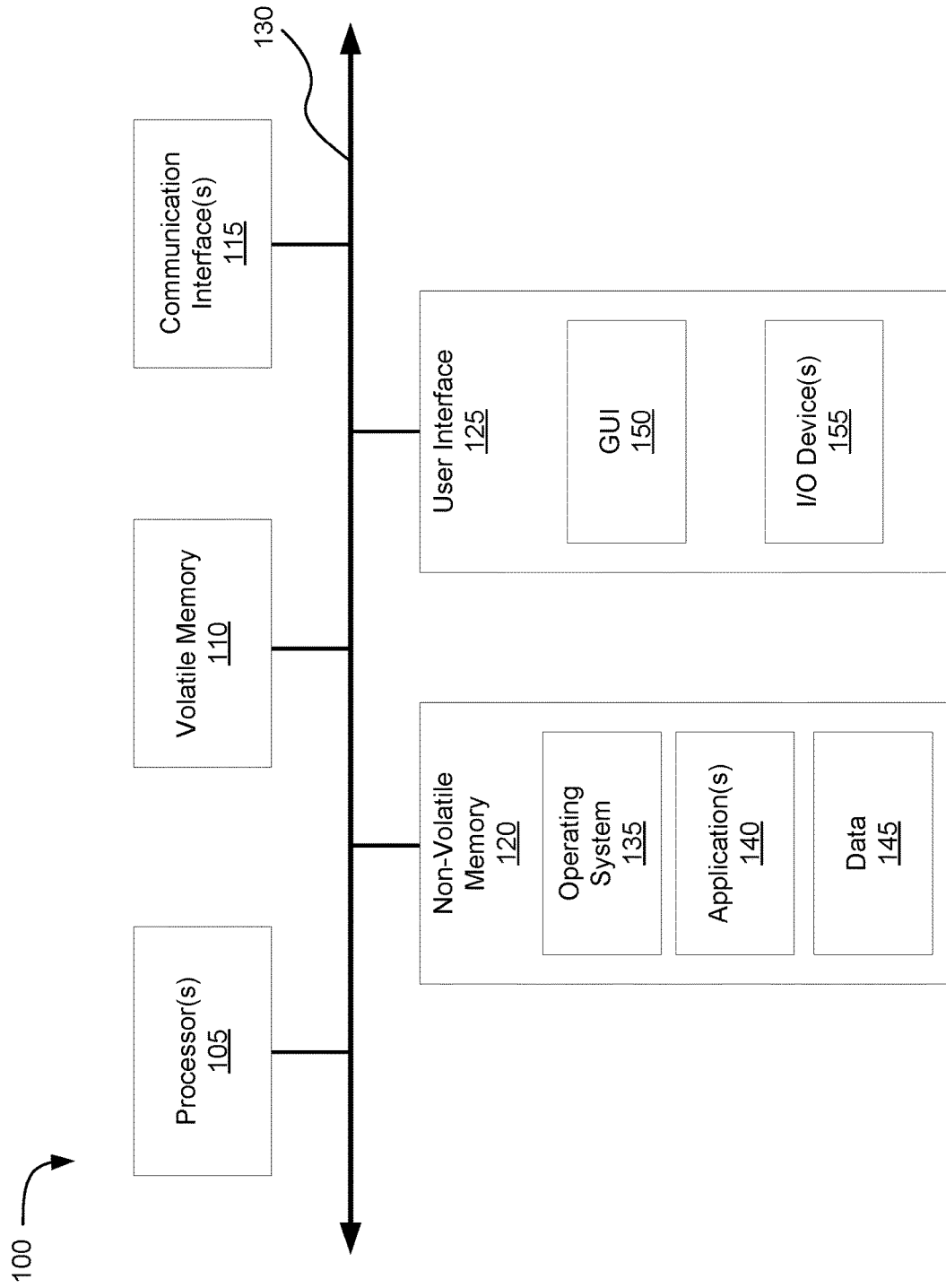
FIG. 1A is a block diagram of embodiments of a computing device.

The features and advantages of the present solution will become more apparent from the detailed description set forth below when taken in conjunction with the drawings, in which like reference characters identify corresponding elements throughout. In the drawings, like reference numbers generally indicate identical, functionally similar, and/or structurally similar elements.

DETAILED DESCRIPTION

For purposes of reading the description of the various embodiments below, the following descriptions of the sections of the specification and their respective contents may be helpful:

Section A describes a computing environment which may be useful for practicing embodiments described herein; and Section B describes systems and methods of reducing vulnerability to servers.

A. Computing Environment

Prior to discussing the specifics of embodiments of the systems and methods of an appliance and/or client, it may be helpful to discuss the computing environments in which such embodiments may be deployed.

As shown in FIG. 1A, computer 100 may include one or more processors 105, volatile memory 110 (e.g., random access memory (RAM)), non-volatile memory 120 (e.g., one or more hard disk drives (HDDs) or other magnetic or optical storage media, one or more solid state drives (SSDs) such as a flash drive or other solid state storage media, one or more hybrid magnetic and solid state drives, and/or one or more virtual storage volumes, such as a cloud storage, or a combination of such physical storage volumes and virtual storage volumes or arrays thereof), user interface (UI) 125, one or more communications interfaces 115, and communication bus 130. User interface 125 may include graphical user interface (GUI) 150 (e.g., a touchscreen, a display, etc.) and one or more input/output (I/O) devices 155 (e.g., a mouse, a keyboard, a microphone, one or more speakers, one or more cameras, one or more biometric scanners, one or more environmental sensors, one or more accelerometers, etc.). Non-volatile memory 120 stores operating system 135, one or more applications 140, and data 145 such that, for example, computer instructions of operating system 135 and/or applications 140 are executed by processor(s) 105 out of volatile memory 110. In some embodiments, volatile memory 110 may include one or more types of RAM and/or a cache memory that may offer a faster response time than a main memory. Data may be entered using an input device of GUI 150 or received from I/O device(s) 155. Various elements of computer 100 may communicate via one or more communication buses, shown as communication bus 130.

Computer 100 as shown in FIG. 1A is shown merely as an example, as clients, servers, intermediary and other networking devices and may be implemented by any computing or processing environment and with any type of machine or set of machines that may have suitable hardware and/or software capable of operating as described herein. Processor(s) 105 may be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations may be hard coded into the circuitry or soft coded by way of instructions held in a memory device and executed by the circuitry. A "processor" may perform the function, operation, or sequence of operations using digital values and/or using analog signals. In some embodiments, the "processor" can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multi-core processors, or general-purpose computers with associated memory. The "processor" may be analog, digital or mixed-signal. In some embodiments, the "processor" may be one or more physical processors or one or more "virtual" (e.g., remotely located or "cloud") processors. A processor including multiple processor cores and/or multiple processors multiple processors may provide functionality for parallel, simultaneous execution of instructions or for parallel, simultaneous execution of one instruction on more than one piece of data.

Communications interfaces 115 may include one or more interfaces to enable computer 100 to access a computer network such as a Local Area Network (LAN), a Wide Area Network (WAN), a Personal Area Network (PAN), or the Internet through a variety of wired and/or wireless or cellular connections.

In described embodiments, the computing device 100 may execute an application on behalf of a user of a client computing device. For example, the computing device 100 may execute a virtual machine, which provides an execution session within which applications execute on behalf of a user or a client computing device, such as a hosted desktop session. The computing device 100 may also execute a terminal services session to provide a hosted desktop environment. The computing device 100 may provide access to a computing environment including one or more of: one or more applications, one or more desktop applications, and one or more desktop sessions in which one or more applications may execute.

Figure 1B:
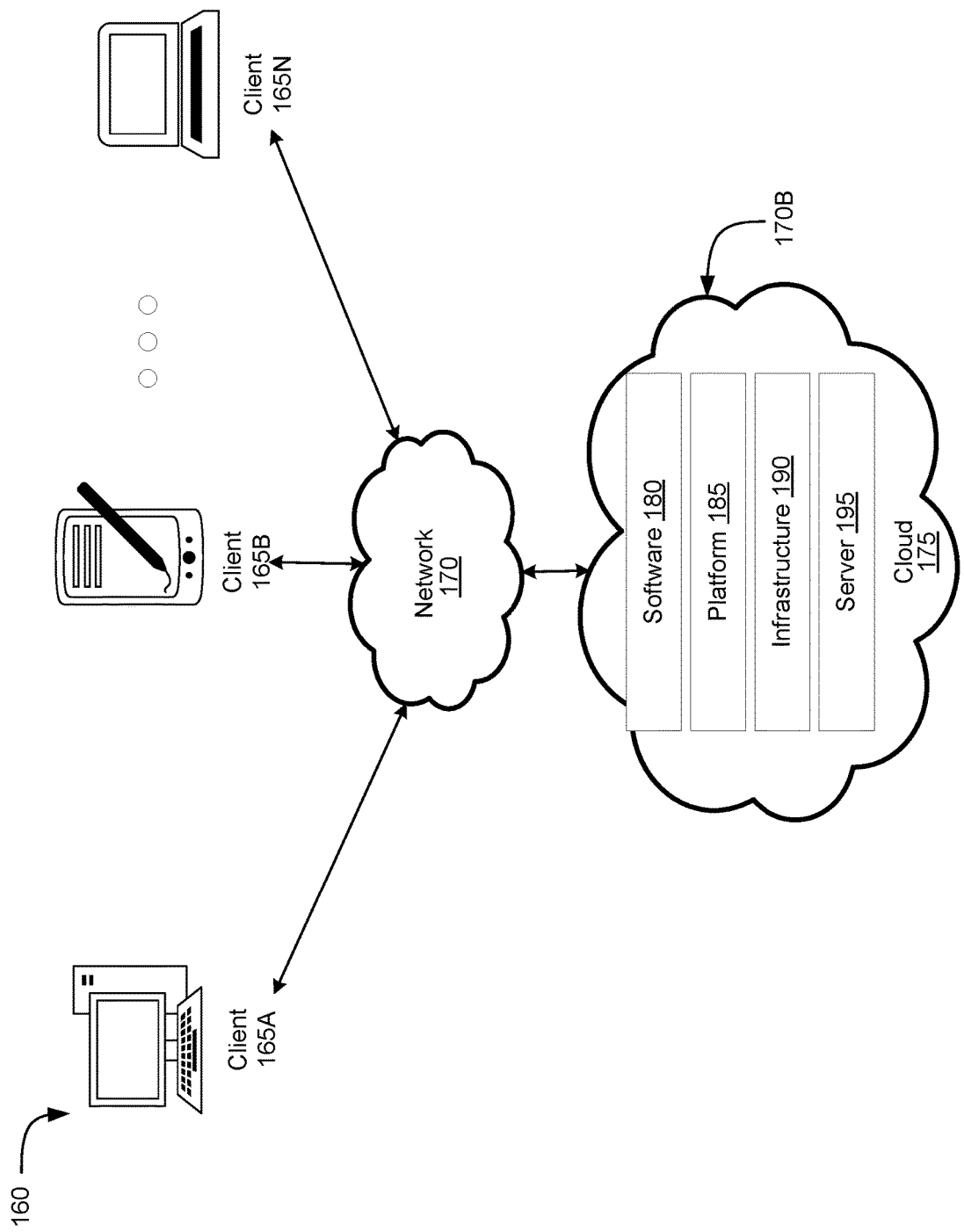
FIG. 1B is a block diagram depicting a computing environment comprising client device in communication with cloud service providers.

Referring to FIG. 1B, a computing environment 160 is depicted. Computing environment 160 may generally be considered implemented as a cloud computing environment, an on-premises ("on-prem") computing environment, or a hybrid computing environment including one or more on-prem computing environments and one or more cloud computing environments. When implemented as a cloud computing environment, also referred as a cloud environment, cloud computing or cloud network, computing environment 160 can provide the delivery of shared services (e.g., computer services) and shared resources (e.g., computer resources) to multiple users. For example, the computing environment 160 can include an environment or system for providing or delivering access to a plurality of shared services and resources to a plurality of users through the internet. The shared resources and services can include, but not limited to, networks, network bandwidth, servers, processing, memory, storage, applications, virtual machines, databases, software, hardware, analytics, and intelligence.

In embodiments, the computing environment 160 may provide client 165 with one or more resources provided by a network environment. The computing environment 160 may include one or more clients 165a-165n, in communication with a cloud 175 over one or more networks 170. Clients 165 may include, e.g., thick clients, thin clients, and zero clients. The cloud 108 may include back end platforms, e.g., servers, storage, server farms or data centers. The clients 165 can be the same as or substantially similar to computer 100 of FIG. 1A.

The users or clients 165 can correspond to a single organization or multiple organizations. For example, the computing environment 160 can include a private cloud serving a single organization (e.g., enterprise cloud). The computing environment 160 can include a community cloud or public cloud serving multiple organizations. In embodiments, the computing environment 160 can include a hybrid cloud that is a combination of a public cloud and a private cloud. For example, the cloud 175 may be public, private, or hybrid. Public clouds 108 may include public servers that are maintained by third parties to the clients 165 or the owners of the clients 165. The servers may be located off-site in remote geographical locations as disclosed above or otherwise. Public clouds 175 may be connected to the servers over a public network 170. Private clouds 175 may include private servers that are physically maintained by clients 165 or owners of clients 165. Private clouds 175 may be connected to the servers over a private network 170. Hybrid clouds 175 may include both the private and public networks 170 and servers.

The cloud 175 may include back end platforms, e.g., servers, storage, server farms or data centers. For example, the cloud 175 can include or correspond to a server or system remote from one or more clients 165 to provide third party control over a pool of shared services and resources. The computing environment 160 can provide resource pooling to serve multiple users via clients 165 through a multi-tenant environment or multi-tenant model with different physical and virtual resources dynamically assigned and reassigned responsive to different demands within the respective environment. The multi-tenant environment can include a system or architecture that can provide a single instance of software, an application or a software application to serve multiple users. In embodiments, the computing environment 160 can provide on-demand self-service to unilaterally provision computing capabilities (e.g., server time, network storage) across a network for multiple clients 165. The computing environment 160 can provide an elasticity to dynamically scale out or scale in responsive to different demands from one or more clients 165. In some embodiments, the computing environment 160 can include or provide monitoring services to monitor, control and/or generate reports corresponding to the provided shared services and resources.

In some embodiments, the computing environment 160 can include and provide different types of cloud computing services. For example, the computing environment 160 can include Infrastructure as a service (IaaS). The computing environment 160 can include Platform as a service (PaaS). The computing environment 160 can include server-less computing. The computing environment 160 can include Software as a service (SaaS). For example, the cloud 175 may also include a cloud based delivery, e.g. Software as a Service (SaaS) 180, Platform as a Service (PaaS) 185, and Infrastructure as a Service (IaaS) 190. IaaS may refer to a user renting the use of infrastructure resources that are needed during a specified time period. IaaS providers may offer storage, networking, servers or virtualization resources from large pools, allowing the users to quickly scale up by accessing more resources as needed. Examples of IaaS include AMAZON WEB SERVICES provided by Amazon.com, Inc., of Seattle, Washington, RACKSPACE CLOUD provided by Rackspace US, Inc., of San Antonio, Texas, Google Compute Engine provided by Google Inc. of Mountain View, California, or RIGHTSCALE provided by RightScale, Inc., of Santa Barbara, California PaaS providers may offer functionality provided by IaaS, including, e.g., storage, networking, servers or virtualization, as well as additional resources such as, e.g., the operating system, middleware, or runtime resources. Examples of PaaS include WINDOWS AZURE provided by Microsoft Corporation of Redmond, Washington, Google App Engine provided by Google Inc., and HEROKU provided by Heroku, Inc. of San Francisco, California SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include GOOGLE APPS provided by Google Inc., SALESFORCE provided by Salesforce.com Inc. of San Francisco, California, or OFFICE 365 provided by Microsoft Corporation. Examples of SaaS may also include data storage providers, e.g. DROPBOX provided by Dropbox, Inc. of San Francisco, California, Microsoft SKY-DRIVE provided by Microsoft Corporation, Google Drive provided by Google Inc., or Apple ICLOUD provided by Apple Inc. of Cupertino, California.

Clients 165 may access IaaS resources with one or more IaaS standards, including, e.g., Amazon Elastic Compute Cloud (EC2), Open Cloud Computing Interface (OCCI), Cloud Infrastructure Management Interface (CIMI), or OpenStack standards. Some IaaS standards may allow clients access to resources over HTTP, and may use Representational State Transfer (REST) protocol or Simple Object Access Protocol (SOAP). Clients 165 may access PaaS resources with different PaaS interfaces. Some PaaS interfaces use HTTP packages, standard Java APIs, JavaMail API, Java Data Objects (JDO), Java Persistence API (JPA), Python APIs, web integration APIs for different programming languages including, e.g., Rack for Ruby, WSGI for Python, or PSGI for Perl, or other APIs that may be built on REST, HTTP, XML, or other protocols. Clients 165 may access SaaS resources through the use of web-based user interfaces, provided by a web browser (e.g. GOOGLE CHROME, Microsoft INTERNET EXPLORER, or Mozilla Firefox provided by Mozilla Foundation of Mountain View, California). Clients 165 may also access SaaS resources through smartphone or tablet applications, including, e.g., Salesforce Sales Cloud, or Google Drive app. Clients 165 may also access SaaS resources through the client operating system, including, e.g., Windows file system for DROPBOX.

In some embodiments, access to IaaS, PaaS, or SaaS resources may be authenticated. For example, a server or authentication server may authenticate a user via security certificates, HTTPS, or API keys. API keys may include various encryption standards such as, e.g., Advanced Encryption Standard (AES). Data resources may be sent over Transport Layer Security (TLS) or Secure Sockets Layer (SSL).

B. Systems and Methods of Reducing Vulnerability to Computing Nodes

Systems and methods of reducing vulnerabilities to endpoint devices (e.g., servers) are provided. Clients and servers can exchange information or data (e.g., in the form of messages) to perform operations or tasks. For example, a client device can transmit a message to a server to perform a function, operation, routine, or other task. Clients and servers can exchange messages using various protocols. Certain protocols can have stricter requirements or constraints compared to other protocol. However, having a stricter protocol can make it more challenging to comply with the protocol (e.g., due to more requirements or parameters for accepting messages), or result in genuine messages getting rejected due to inadvertent errors (e.g., safe or acceptable messages getting rejected due to stricter protocol). Further, clients or server may perform additional processing to construct the message or otherwise process the message, thereby causing additional computing resource utilization, which can introduce delays in exchanging and processing the messages. On the other hand, a lean and flexible protocol may reduce the amount of processing performed by the client or server to construct and respond to the messages, while accepting a greater number of messages and rejecting fewer messages, as compared to a strict protocol. However, a flexible or lean protocol can expose a server to an attack.

In an illustrative example, the gRPC protocol can be a lean protocol that is compatible with different programming languages, operating systems, or types of devices. However, the gRPC protocol may be more vulnerable to abuse, which may be a result of its flexibility and how lean the protocol is (e.g., being backward and forward compatible, accepting fields in any order, among other flexibilities offered by gRPC protocol). The gRPC protocol may be more vulnerable to abuse because the protocol instructs servers to be flexible by accepting messages that may not be constructed properly or contain errors, which allows an attacker to include an attack in the message, which the server would be instructed to accept. The following examples in the gRPC can give rise to abuse or attacks on server farms: duplicate fields, backwards and forwards compatibility, fields in any order, missing field validation, and hidden fields, which are described in further detail below.

The gRPC specification allows for duplicate fields (e.g., fields with the same name, value, or name-value pair). The gRPC protocol specifies or instructs a server to accept the last of all duplicate fields in a message. The gRPC protocol further indicates that either the last of the duplicate fields in the message wins (e.g., selected or accepted from the various duplicate fields in the message), or that the server is to concatenate or combine the values of all the duplicate fields to obtain (or not discard) non-duplicate values. To be compliant with gRPC, the server can scan the entire message to identify the duplicate fields before the server can validate the contents of the fields. Scanning the entire message for duplicate fields can constitutes a DOS type vulnerability because the server may consume computing resources or processor resources to scan all of the fields in the message to look for duplicate fields before it can validate a bad message or respond to a valid one. For example, an attacker or other malicious message can repeatedly cause the server to scan all of the fields of the message, resulting in the server being unable to process other genuine messages or introduce latency or delays in the server processing genuine messages.

To improve compatibility, servers using the gRPC protocol can also accept messages with unknown field numbers. To do so, the server receives these fields before identifying which fields are to be validated, thereby leaving the servers vulnerable to a DOS attack or injection attack. To improve flexibility, gRPC messages can contain field numbers in any order. For this reason the gRPC server can process through any amount of unknown fields looking for required fields, thereby leaving the servers vulnerable to being overloaded (e.g., exhausting the servers of their resources or increasing traffic to the servers) so as to delay or otherwise prevent processing of original or genuine content of messages.

The gRPC protocol lacks range checking and string content validation functionalities, because the gRPC protocol design is intended to be more forgiving and allow servers to accept messages in a more flexible manner. Thus, servers using the gRPC protocol may accept a maximum size of values for all parameters, leaving the validation to the individual server components. Messages sent using the gRPC protocol can have hidden fields with data that is not validated by the gRPC libraries. The hidden fields can be used to place 'injection type' attack vector or other dangerous content contiguous to a valid input parameter string, thereby leaving the server processing the message vulnerable to an attack. For example, dangerous content (e.g., malicious field(s) in a message with invalid range or unknown string content) can be placed next to the valid input parameter string. Since the gRPC protocol lacks range changing and string content validation, a server may accept and process the message with the dangerous content, exposing the server to an attack, for example.

Systems and methods of this technical solution can reduce node (e.g., a server) vulnerabilities, while offloading processing done by the node, by providing an intermediary device that can intercept messages sent using a protocol, process the message, and transform the message into a message absent invalid or objectionable fields or values. The intermediary device can act as an inline proxy or a virtual proxy cloud service, for example, in the gRPC transaction path. The intermediary device can scan the message (e.g., a gRPC message) in real time (e.g., responsive to receipt of the message, within 0.1 second of receipt, within 0.2 seconds of receipt, within 0.3 seconds, 0.5 seconds, with 1 second, or other time interval), thereby mitigating one or more server vulnerabilities by detecting and removing redundant or unwanted fields and validating field content for known vulnerabilities.

The intermediary device can perform data validation by enforcing a custom range, value, and type options that can be specified in configuration file (e.g., a .proto file) accessible to the intermediary device. The intermediary device can remove attack vectors, such as injection attacks, by ensuring that all fields in the message are fully described by the configuration file. The intermediary device can offload or reduce node (e.g., server) load by eliminating unnecessary or redundant fields in the message that is sent to the node, thereby reducing device load and computing resource utilization. The intermediary device can reduce or prevent DOS attacks by removing redundant and unnecessary fields such that the gRPC servers are no longer as vulnerable to being overloaded by unknown fields or redundant fields. The intermediary device can further perform range checking on strings and repeated fields to further limit the vulnerability to overload. The intermediary device can confirm the range of values in fields by modifying non-compliant field values (e.g., values or sizes out of range) on the fly (e.g., in real-time or responsive to receipt of the message or detection of the non-compliant field values) to generate a message with compliant values.

Figure 2:
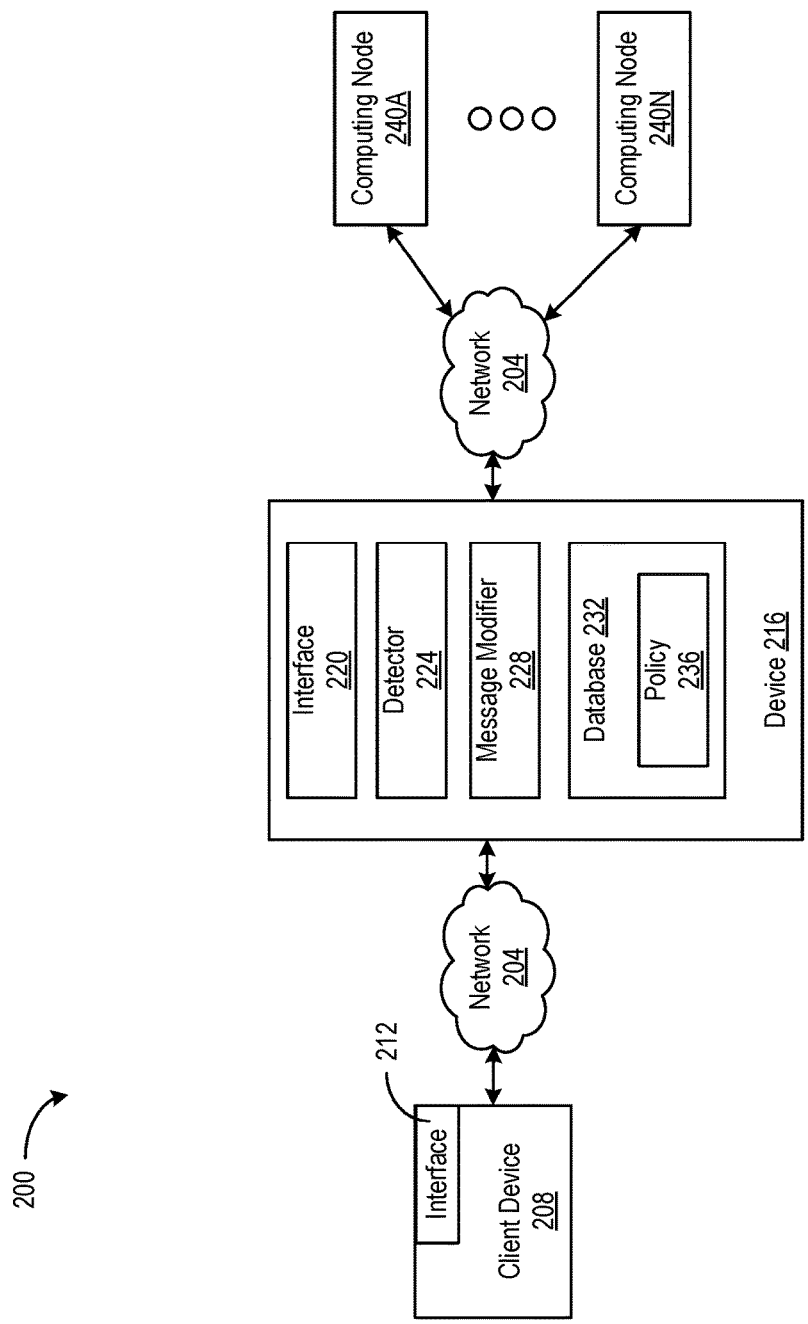
FIG. 2 is a block diagram of a system for reducing vulnerability to nodes of a computing environment, in accordance with an embodiment.

Referring now to FIG. 2, depicted is a block diagram of a system 200 for reducing vulnerability to end or other network nodes (e.g., servers), in accordance with embodiments. The system 200 can include one or more networks 204, at least one client device 208, at least one device 216, and one or more servers 240A-N (sometimes generally referred to as server(s) 240). The one or more components (e.g., client device 208, device 216, or the server 240) of the system 200 can establish communication channels or transfer data via the network 204. For example, the client device 208 can communicate with the device 216 through a first network and the device 216 can communicate with servers 240 via a second network. In some cases, the first network and the second network can be the same network 204. In some other cases, the first network and the second network may be different networks bridging or enabling communication between different devices or components of the system 200.

The network 204 can include computer networks such as the Internet, local, wide, metro or other area networks, intranets, satellite networks, other computer networks such as voice or data mobile phone communication networks, and combinations thereof. The network 204 may be any form of computer network that can relay information between the one or more components of the system 200. The network 204 can relay information between client devices 208 and one or more information sources, such as web servers or external databases, amongst others. In some implementations, the network 204 may include the Internet and/or other types of data networks, such as a local area network (LAN), a wide area network (WAN), a cellular network, a satellite network, or other types of data networks. The network 204 may also include any number of computing devices (e.g., computers, servers, routers, network switches, etc.) that are configured to receive and/or transmit data within the network 204. The network 204 may further include any number of hardwired and/or wireless connections. Any or all of the computing devices described herein (e.g., client device 208, device 216, servers 240, etc.) may communicate wirelessly (e.g., via WiFi, cellular, radio, etc.) with a transceiver that is hardwired (e.g., via a fiber optic cable, a CAT5 cable, etc.) to other computing devices in the network 204. Any or all of the computing devices described herein (e.g., client device 208, device 216, servers 240, etc.) may also communicate wirelessly with the computing devices of the network 204 via a proxy device (e.g., a router, network switch, or gateway). In some implementations, the network 204 can be similar to or can include the network 170 or a computer network accessible to the computer 100 described herein above in conjunction with FIG. 1A or 1B.

The system can include at least one client device 208 (or various client devices 208). Client device 208 can include at least one processor and a memory, e.g., a processing circuit. The client device 208 can include various hardware or software components, or a combination of both hardware and software components. The client devices 208 can be constructed with hardware or software components and can include features and functionalities similar to the client devices 165 described hereinabove in conjunction with FIGS. 1A-B. For example, the client devices 165 can include, but is not limited to, a television device, a mobile device, smart phone, personal computer, a laptop, a gaming device, a kiosk, or any other type of computing device.

The client device 208 can include at least one interface 212 for establishing a connection to the network 204. The client device 208 can communicate with other components of the system 200 via the network 204, such as the device 216 or the servers 240. The interface 212 can include hardware, software, features, and functionalities of at least a communication interface(s) 115 or user interface 125 as described hereinabove in conjunction with FIG. 1A. For example, the client device 208 can transmit or receive data packets to or from the servers 240 through a device 216 intermediate between the client device 208 and the servers 240. In some cases, the client device 208 can communicate with other client devices.

The client device 208 can include, store, execute, or maintain various application programming interfaces ("APIs") in the memory (e.g., local to the client device 208). The APIs can include or be any types of API, such as Web APIs (e.g., open APIs, Partner APIs, Internal APIs, or composite APIs), web server APIs (e.g., Simple Object Access Protocol ("SOAP"), XML-RPC ("Remote Procedure Call"), JSON-RPC, Representational State Transfer ("REST")), among other types of APIs or protocol described hereinabove in conjunction with clients 165 of FIG. 1B. The client device 208 can use one or more types of Remote Procedure Calls ("RPCs"). For example, the client device 208 can use one or more types of RPCs to access resources of applications or micro applications containing a subset of features of at least one source application. The client device 208 can use one or more types of RPCs to initiate features or functionalities of the application or utilize services of various applications. The client device 208 can use one or more types of RPCs to perform other features, such as communicate with applications executing on the server 240 (sometimes referred to as a computing node or a network node) or other devices remote from the client 208. The client device 208 can launch at least one client application to communicate with one or more applications executing on the server 240. For example, the client device 208 can exchange (e.g., transmit or receive) data packets with applications from the server 240 via the client application executing on the client device 208.

The client device 208 can communicate with applications executing on the server 240 using one or more types of RPC (e.g., gRPC, etc.). The gRPC protocol can refer to a framework that uses protocol buffers as both its Interface Definition Language ("IDL") and as its underlying message interchange format. In gRPC, client applications (e.g., applications installed on the client device 208) can call a method or a function from one or more server applications (e.g., applications executing or with resources on the server 240) as if the method or the function was a local object. In this case, the client device 208 can transmit messages (e.g., gRPC messages) to the server 240 via the network 204 and the device 216. The differences between gRPC and one or more other protocols can include, but are not limited to, that gRPC hides HTTP details using a predefined mapping, enables integration of services in different programming languages, and uses protocol buffers messaging format. For example, the applications (e.g., network applications) can be coded or generated in different languages (e.g., Java, Python, C#, etc.) to execute operations or instructions. The client device 208 can establish a communication channel or connect to one or more of these applications via gRPC. The client device 208 can use gRPC to bridge communication between applications with different languages, such as to perform a collection of tasks from different applications (e.g., product website or a web page of a first application (or micro application), checkout or financing system from the web site of a second application, or shipping service of a third application).

Further, the client device 208 can communicate with the server 240 through a gRPC framework of the server 240. The client device 208 can use a protocol buffer format to transmit messages with various fields to the server 240 (or the applications executing on the server 240). A protocol buffer can refer to a language-neutral, platform-neutral, extensible mechanism for serializing structured data. Protocol buffer can support code written in multiple languages, such as Python, Objective-C, C++, Java, among others. The fields can be established based on a list of compatible fields supported by the server 240). For example, the client device 208 (e.g., via a background process of an application executing on the client device 208) can download, install, or otherwise obtain configuration files or libraries (e.g., stub libraries) from the server 240 to determine the fields that are accepted by the server 240. The client device 208 can communicate with the server 240 via the application. The client device 208 can setup a client gRPC sub-layer for communication with the server 240, such that messages can be sent to the server 240 having supported fields, such as messages, values (e.g., field values), or types of fields accepted by the server 240. The administrator of the server 240 can manage the gRPC API and the proto file of the server 240 to configure the compatible or supported field numbers, field values, among other parameters between client devices 208 and the servers 240. The client device 208 can generate various messages including one or more fields having name-value pairs for transmitting to the server 240. The client device 208 can provide or input fields, names, or values into a proto file (e.g., a new proto file or existing proto file) for compiling using a compiler compatible with the server 240. Once compiled, the client device 208 can transmit at least one message (e.g., encoded message) having one or more fields to the server 240. The fields can be valid fields accepted by the server 240. In some cases, certain client devices 208 may configure the fields or generate their own fields for sending to the server 240 within one or more messages. These fields may or may not be accepted by the server 240 or can cause vulnerability to the server 240.

Figure 3A:
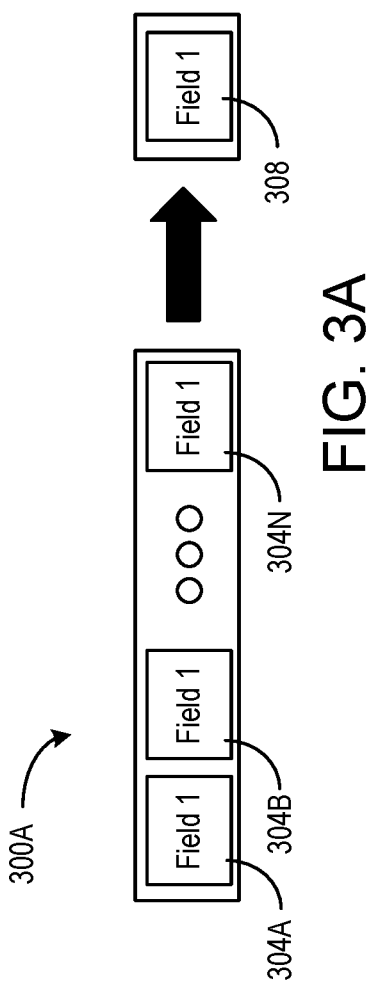
FIGS. 3A-B are example illustrations of a message containing objectionable fields, in accordance with an embodiment.
Figure 3B:
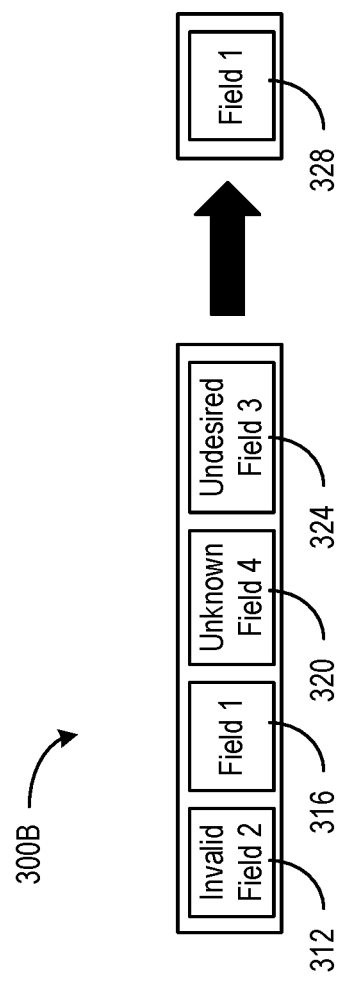

The client device 208 can connect a microservices ecosystem using gRPC, such that the client device 208 can communicate between various applications (e.g., independent of languages) to collectively perform a service from microservices. In this case, the client device 208 may be or include a gRPC client and the server 240 may be or include gRPC server. To communicate with the server 240 (e.g., gRPC server using a framework running over HTTP/2 protocol), a protocol file can be created, generated, or downloaded on the client device 208 that describes their interface, compile, and transmit the protocol file to the server 240. Before transmitting to the server 240, the client device 208 can transmit the protocol file (or messages) to the device 216 for processing. Illustrative examples of the fields in messages are shown in FIGS. 3A-B.

The system can include one or more servers 240. One or more of the servers 240 can be or include a gRPC server, Software-as-a-Service ("SaaS") application server, a network application server, among other types of servers. The server 240 can be composed of hardware or software components, or a combination of both hardware or software components. The server 240 can include resources for executing one or more applications, such as SaaS applications, network applications, or other applications within a list of available resources maintained by the server 240. The server 240 can include one or more features or functionalities of at least resource management services or other components within the cloud computing environment. In some cases, the server 240 can include features or functionalities of the cloud 175, remote from the client device 208. The server 240 can communicate with the client device 208 via a communication channel established by the network 204, for example.

The server 240 can receive data packets or messages from client devices 208 via the network 204 and the device 216 that is intermediary to the client device 208 and the server 240. The server 240 can receive the messages encoded using a protocol buffer format. The server 240 can process or decode messages from the client devices 208. The server 240 can select one or more elements of the messages (e.g., fields or name-value pairs) to execute service methods (e.g., operation or service of one or more applications) or encode service response to the client device 208. However, using gRPC, the server 240 may be vulnerable to attacks from devices connected to the server 240.

For example, the server 240 may accept duplicate fields in the message. The server 240 may scan the entire message looking for the last duplicate field to process or concatenate messages of duplicate fields, thereby creating a "DoS" type vulnerability in the server 240 while looking for the last duplicate field or concatenating messages from similar fields. The server 240 may be backward and forwards compatible. For example, the server 240 may accept messages with unknown field numbers (e.g., ranging from at least 1 to $2^{29}-1$ in binary format). Further, the server 240 may process these fields with unknown field numbers before finding their required fields to validate (e.g., comparing the unknown field numbers to reserved field numbers or numbers stored in the configuration file). Hence, the backward and forwards compatibility of the server 240 (e.g., gRPC server) may be vulnerable to DoS and injection attacks from devices (e.g., client devices 208 or other devices of the network 204).

In further example, the server 240 can allow flexibility of receiving fields in any order, which can leave the server 240 communicating with the gRPC protocol vulnerable to stacking optional wasted resources (e.g., unwanted fields or data) before receiving necessary fields for processing. In this case, the server 240 may be overloaded by these optional data, since hidden fields are allowed to be placed contiguously to valid data in memory. The server 240 may also lack gRPC range checking and string content validation (e.g., field validation), such that the server 240 may accept max size values for all parameters (e.g., max sized message or values of each name-value pair). In this case, validation may be left to individual server internals. Additionally, fields or data not validated by gRPC libraries (or configuration files) may be hidden from the validation procedure of the server 240. For example, based on this vulnerability, NoSQL ("non-SQL") injection attacks or other malicious content can be placed physically contiguous to valid input parameter strings within a message received from devices of the network 204, which can lead to an attack on the server 240. The administrator managing the gRPC API of the server 240 can configure a proto file configured for users to download to indicate fields (or messages) supported by the server 240.

Accordingly, the server 240 communicating with client devices 208 or other devices via protocol buffer format of gRPC, although lean and compatible with a variety of different languages, can be vulnerable to attacks arising from the fewer constraints of the gRPC protocol that makes the protocol more flexible. Therefore, the server 240 may receive messages processed and analyzed by the device 216. For example, the server 240 can receive messages from the client devices 208 via the device 216 intermediaries to the server 240 can the client devices 208.

The system can include at least one device 216. The device 216 may be referred to as an intermediary device, an appliance, a data processing system, or a gRPC appliance, for example. The device 216 can be or include any intermediary device, such as inline proxy or virtual proxy cloud service. The device 216 can be composed of hardware or software components, or a combination of hardware and software components. The device 216 can be intermediate between client devices 208 and servers 240 in that communications between the client device 208 and the server 240 can flow through the device 216. The device 216 can intercept data between client devices 208 and servers 240. The device 216 can receive data packets or information from the client devices 208 and the servers 240. The device 216 can forward or transmit data packets from the client devices 208 to at least one server 240 or from the servers 240 to at least one client device 208. The device 216 can be in a communications path or channel (e.g., the gRPC transaction path), such that the device can intercept messages (e.g., gRPC messages) from either the client devices 208 or the servers 240. The device 216 can transmit or receive data to or from other devices connected to the network 204 or of the system 200. The device 216 can include one or more of an interface 220, a detector 224, a message modifier 228, or a database 232. The device 216 can include other components (e.g., processors and memory) to perform features and functionalities described herein.

The interface 220 can include hardware, software, or a combination of hardware and software components to interface with the network 204, devices within the system 200

(e.g., client devices 208 or servers 240), or components of the device 216. The interface 220 can include features and functionalities similar to the communication interface 115 to interface with the aforementioned components, such as in conjunction with FIG. 1A. For example, the interface 220 can include standard telephone lines LAN or WAN links (e.g., 802.11, T1, T3, Gigabit Ethernet, Infiniband), broadband connections (e.g., ISDN, Frame Relay, ATM, Gigabit Ethernet, Ethernet-over-SONET, ADSL, VDSL, BPON, GPON, fiber optical including FiOS), wireless connections, or some combination of any or all of the above. Connections can be established using a variety of communication protocols (e.g., TCP/IP, Ethernet, ARCNET, SONET, SDH, Fiber Distributed Data Interface (FDDI), IEEE 802.11a/b/g/n/ac CDMA, GSM, WiMax and direct asynchronous connections). The interface 220 can include at least a built-in network adapter, network interface card, PCMCIA network card, EXPRESSCARD network card, card bus network adapter, wireless network adapter, USB network adapter, modem, or any other device suitable for interfacing one or more devices within the system 200 to any type of network capable of communication. The interface 220 can communicate with one or more aforementioned components to at least receive data from client devices 208 for processing and transmit data to at least the servers 240 to reduce the vulnerability and improve performance of the server 240.

The device 216 can include a detector 224 (e.g., message detector) designed, constructed, and operational to receive a message of an RPC from the client device 208 that is being sent to the server 240. The detector 224 can scan, analyze, process or otherwise handle the messages (e.g., gRPC messages or protocol files). The detector 224 can scan the message in real-time, such as during data transmission from one component to another component of the system (e.g., between client devices 208 and the servers 240). The detector 224 can scan the message responsive to (e.g., immediately after) receiving the messages from either the client devices 208 or the servers 240. The detector 224 can identify or determine the type of protocol being used to construct or transmit the message. The type of protocol can be identified based on information contained with each packet or message being transferred. For example, the detector 224 can determine that the type of message corresponds to a gRPC protocol. The detector 224 can detect that the destination of the message is for the server 240 executing the gRPC framework. The detector 224 can extract, break down, or otherwise decode the message to determine a destination address, a destination port, among other indication of the destination for the message. The detector 224 can detect that the message is in binary format (e.g., based on extracted content of the message) and that the message includes a stub having the same methods as the service provided by the server 240. Among other detection techniques, the detector 224 can determine that the type of message corresponds to a gRPC protocol based on the formatting of the message and the name-value pairs within the message. For example, the detector 224 can extract the fields from the message. The detector 224 can identify that the fields include name-value pairs or that the formatting of the message is used by the gRPC protocol (e.g., gRPC server). The detector 224 can detect the source of the message, such as whether the messages (e.g., fields used within the messages from the client device 208) are generated using at least one of the stub libraries or configuration files downloaded from the server 240. For example, the device 216 can detect or identify fields of the messages (e.g., via extraction of the message or based on the supported field listed in the library) that are supported by the server 240 or in the stub libraries (e.g., having objects shared with other devices) from the server 240. Based on the type of message indicated by, for example, the header of the message, the detector 224 can decode or extract one or more fields from a message, among other contents. The fields can include name-value pairs, such as field name or field value. The message can indicate a function or an instruction for the server 240 to execute or perform.

The detector 224 can determine a configuration, specification, or definition established for the message. The detector 224 can perform a lookup for a file (e.g., proto file), stub library or policy 236 associated with the message to determine the configuration or custom specification for the message. For example, the message can relate to a particular service performed by the server, and a provider of the service can establish the file (e.g., a proto or other configuration file) or policy 236 or configuration for the message. The detector 224 can compare the fields or values of the message with the fields specified by the file or policy 236 established for the message to determine whether one or more fields or values are objectionable or invalid, and how to modify the message so that it is in conformance with the policy.

The detector 224 can detect the range, value, or type of fields included in the messages. The range, value, type, among other detectable elements of the fields, can be referred to as the parameters of the field. The range can indicate the minimum or maximum integer values, such as the range of field values (e.g., field numbers) included in the message. The value can be or indicate the field value of individual fields in the message. The type can refer to or indicate the field type of individual fields, such as two integers or a string type. The field types can be expanded including administrator (or user) generated fields, such as enumerations type or other message types. For example, responsive to receiving the message from the client device 208, the detector 224 can identify the values and type of individual fields in the message. The detector 224 can detect or identify one or more ranges occupied by the field values. The detector 224 can detect the size of the message or the size of individual fields in the message. The detector 224 can provide these detectable elements (e.g., range, value, type, etc.) to the message modifier 228 for configuring, modifying, removing, or otherwise maintaining the fields or messages based on the information of individual fields.

The detector 224 can detect duplicated fields based on one or more of the same field names in the message, where individual fields can include at least one name-value pair. The detector 224 can determine the field values within duplicated field names. The detector 224 can transmit information related to duplicated field names, or any differences in the field values from individual fields with the same name, to the message modifier 228 to enforce the policy and modify the message accordingly. The detector 224 can detect any unknown fields. In some cases, the unknown fields can refer to field numbers that are outside the range of unique number used to identify the fields in message binary format. For example, the detector 224 can detect a field having a field number of less than 1 or greater than $2^{29}$, which is outside the allowable range of the assigned field numbers. In this case, the detector 224 can determine that these fields are unknown and can report to the message modifier 228 to modify the message. In some cases, the unknown field can refer to an unknown field type. For example, the detector 224 can detect a custom field type in the message. However, if the custom field type is not described in the file (e.g., the proto file) or stub libraries, the message modifier 228 may not know what the field type is, and in turn, the detector 224 can detect that this field as an unknown field (e.g., based on the fields not included in the policy 236 or proto file).

The detector 224 can detect objectionable or invalid fields. Invalid fields can refer to fields with field numbers within a range of numbers reserved for other fields or functions, such as protocol buffers implementations occupying field numbers between 19000 through 19999. The detector 224 can detect that the fields between these field numbers as invalid (e.g., based on the proto file or policy 236). In some cases, invalid fields can refer to fields (e.g., alone or when combined) having a size greater than the maximum allowed size (e.g., as indicated in the proto file or policy 236) for the fields or messages. If the fields, or the messages, are above the size limit (e.g., as indicated in the policy 236), the detector 224 can notify the message modifier 228 that one or more fields are invalid and either remove or split the messages in multiple chunks. The detector 224 can detect fields that include undesirable values or numbers, such as configured by the administrator of the server 240, indicating field values to accept or refuse. The detector 224 can receive or retrieve the policy indicating the range of field values (or in some cases the size of the fields or messages) that should not be in the message. The detector 224 can identify, based on the values of individual fields, one or more fields with values within the range for exclusion indicated by the policy. The detector 224 can forward or pass the detected information or indication to the message modifier 228 for configuring (or maintaining) the fields or messages.

The detector 224 can detect hidden data injected into messages from client devices 208. In some cases, the detector 224 can detect hidden data in messages from the server 240. For example, the detector 224 can detect hidden data adjacent to valid inputs by identifying whether the fields in the messages are fully described by their file (e.g., a proto file) definition (e.g., data structure or services in the proto file). The detector 224 can compare or confirm that the field names and field values of the message are fully described in the proto file definition (sometimes referred to as proto definition file). The detector 224 can compare the fields to a configuration file (e.g., stub library or the proto file generated by the administrator of the server 240) to confirm if the fields are supported.

In some cases, when receiving a file (e.g., a proto file) from the server 240, the device 216 can compile the file into a document, such as a JSON document. The detector 224 can import the JSON document and arrange or store the JSON information (e.g., range of the values) in the database 232. The JSON information can be referred to as a memory representation of the file (e.g., a registry). The JSON information can be used as a runtime validator to ensure all fields are fully described in their definition file. While identifying the fields in the message, the detector 224 can perform a look-up for values in the registry. The detector 224 can determine if the values from individual fields are there in the registry and that they conform to the range indicated by the registry. Based on whether the value (e.g., field value) is present and based on the conformity, the detector 224 can notify the message modifier 228 whether to remove or maintain the fields. For example, if the values are not in the registry or not conforming to the range indicated by the registry, the detector 224 can transmit instructions or indication of invalid values to the message modifier 228, such that at least the field is removed from the message. Otherwise, if both conditions are met, the detector 224 can send an indication of valid fields to the message modifier 228.

In some cases, the detector 224 can scan for control characters (e.g., non-printing characters). The control characters can include code points or a number in a character set. The detector 224 can detect the fields or messages with control characters to the message modifier 228. In some cases, the detector 224 can retrieve one or more policies from the database 232 indicating which control characters should be excluded from the message. Based on the policy configured by the administrator of the server 240, the detector 224 can detect at least one field or at least one message that includes these control characters (e.g., a part of undesired fields).

The device 216 can include a message modifier 228 designed, constructed, and operational to modify or remove one or more fields of the message to address any potential attack on the server 240 based at least on the identification of duplicate fields or otherwise invalid or objectionable fields or values of the fields. Modifying the message can include generating a new message that does not include fields or values that are determined to be malicious or contain an attack vector, while including fields with values that are determined to be safe and organized in a manner (e.g., aggregated values from duplicate fields) that can reduce server or node processing load. The device 216 can modify existing or received messages from the client device 208 (or the server 240) based on information of the message (e.g., detection of each field in the message) detected by the detector 224. The message modifier 228 can modify the message or file received from one or more client devices 208 based on the policies configurable by the administrator of the server 240. The policies can be stored in the database 232, such that one or more components (e.g., detector 224 or message modifier 228) of the device 216 can retrieve or enforce the policies in the message. The message modifier 228 can determine to modify the message in various different approach or techniques (e.g., removing one or more fields, discarding the message, generating a new message with selected fields, among others) based on one or more objectionable elements (e.g., invalid, duplicate, unknown, undesired, etc.) detected by the detector 224. Accordingly, the message modifier 228 can modify the message (e.g., a first message) or generate a second message having either selected fields or modified fields from the first message. The message modifier 228 can retrieve one or more policies from the database 232 to modify the messages based on the policies as discussed herein. The message modifier 228 can determine whether to modify the message, which modification techniques to use and in what situations to use different modification techniques (e.g., types of objectionable fields, how many of those types in a single message, one or more combination of types of objectionable fields, etc.) based on the policies.

For example, the policies can be based on the preferences of the administrator of the server 240. The policies can indicate fields (or parameters of the fields) to accept or reject in the messages from client devices 208. The policies can be stored and configured in the database 232. In some cases, the policies can indicate what parameters or information of the message that the detector 224 will detect (e.g., field numbers, field values, field ranges, size of the message, types of fields, etc.). The policy can include instructions for modifying the messages, such as how to handle duplicated fields, invalid fields, unknown fields, or undesired fields. For example, the message modifier 228 can enforce the policies by removing one or more fields based on the category detected by the detector 224. The message modifier 228 may remove any fields that are categorized as one of any objectionable categories (e.g., invalid, unknown, undesired, duplicate, etc.). In some cases, the message modifier 228 may discard messages with at least one field having at least one type of objectionable category based on the policies. In some other cases, the message modifier 228 can maintain at least one type of objectionable category and remove other types.

For example, the message modifier 228 can maintain invalid or unknown fields, such as fields with field numbers outside the range of accessible values or field numbers that are in the range of reserved numbers. The message modifier 228 may remove fields in other objectionable categories. Hence, if the message modifier 228 receives a message having at least a first field with an unknown value, a second field with an invalid value, and a third field with an undesired value, the message modifier 228 can remove the third field while maintaining and modifying the first field and second field. In this case, the message modifier 228 can adjust the field number of the first field and the second field to valid and unreserved values.

In some cases, the message modifier 228 can enforce at least one of the policies by filtering messages with one or more combinations of the above objectionable fields. For example, if a message includes a field with a type of objectionable category, the message modifier 228 can remove, based on the policy, the field from the message. In another example, if a message includes multiple fields with varying types of objectionable categories, the message modifier 228 can discard the message with these fields based on the policy. In further example, the multiple fields may not be of varying types. Depending on the policy, the message modifier 228 can either remove individual fields that are objectionable or the entire message containing the fields.

In some cases, the message modifier 228 can remove fields or messages with certain control characters. For example, the policy can indicate the removal of fields having null, escape, delete, among other control characters in the field value. In some cases, the policy can indicate the removal of the control characters themselves in fields containing the specified control characters. The policy can indicate the size limit or field types limit to enforce, configured by the administrator of the server 240. Servers 240 with a different administrator can configure the policy differently. Further, the message modifier 228 can enforce the exclusion of certain field range(s), field number(s), or field type(s) configured by the server 240. For example, the message modifier 228 can modify the message, such that the fields or messages containing at least one field may be removed, discarded, or otherwise modified if falling within the range, including the field number, or include the field type indicated by the policy.

By enforcing the policies, the message modifier 228 can either remove fields that should not be forwarded to the server 240 or the entire message associated with the field (e.g., message with at least one objectionable field, including at least one of invalid, duplicate, undesired, or unknown field). In some cases, the message modifier 228 can enforce the policies and perform features and functionalities further described herein to modify the message or generate a new message to transmit to the server 240.

The message modifier 228 can perform data validation by identifying one or more parameters of the message configured, generated, or indicated by the administrator of the server 240. For example, the message modifier 228 can identity at least one of a custom range, value, or type enforced by the policy. The custom range, value, or type can be based on annotation inside a proto file from the server 240. The annotation generated or provided by the administrator of the server 240 manages the proto files, for example. The message modifier 228 can use the annotation or options that the administrator added to fields to determine the fields valid for transmitting to the server 240. The message modifier 228 can compare the parameters of fields to the annotation, such as to determine whether to remove, modify, or maintain the fields in the message for forwarding/transmitting to the server 240. This comparison can include field number matching, such as to determine whether there are invalid, duplicated, unknown, or undesired field numbers.

The message modifier 228 can remove one or more fields not annotated in the file (e.g., the proto file) of the server 240. The message modifier 228 can remove the one or more fields from the message. The message modifier 228 can maintain fields necessary for communicating the message between client devices 208 and the servers 240. For example, to perform at least a feature or operation by the server 240, the message modifier 228 can maintain the valid fields necessary to execute the function or instructions for performing the feature.

The message modifier 228 can receive one or more identifications of at least one of duplicate field, unknown field, invalid field, undesired field, or other objectionable types of fields. For example, for duplicate fields, the message modifier 228 can select the last field of the duplicate fields that is of a single value. The message modifier 228 can determine that the duplicate fields include duplicate messages. In this case, the message modifier 228 can select the last field with the duplicated message for forwarding to the server 240. In some cases, the message modifier 228 can detect duplicate arrays which may not include duplicate field values. If the field values are different between fields having the same field name or field number, the message modifier 228 can merge the values for these duplicate fields or concatenate the values to output a single field having combined field values.

The message modifier 228 can receive an indication, from the detector 224, that at least one field is invalid. For example, an invalid field can include field numbers within a range reserved for other functions or field names. The message modifier 228 can remove fields with field numbers within the restricted or reserved range. In another example, the field can be greater than a size limit or cause the message to surpass the size limit indicated by the server 240. In this case, the message modifier 228 may either remove the field or split the field to a different message, such that the message size and/or the field size does not exceed to size limit imposed by the server 240.

The message modifier 228 can receive an indication or other output, from the detector 224, that the field is unknown, for example, based on an absence of the field from the configuration file. For example, the field number detected by the detector 224 can be outside the range of the restriction for any fields. In another example, the field can include a custom field type not described in the registry, such that the field values may not be used by the server for operation. Therefore, with unknown fields, the message modifier 228 can remove unknown fields from being transmitted to the server.

The message modifier 228 can receive an indication, from the detector 224, that at least one field is undesirable. For example, the policy can indicate the fields, which can include field values, field numbers, or field types, to exclude (e.g., configured by the administrator of the server 240). The message modifier 228 can remove the undesirable fields from the message. In some cases, the message modifier 228 can perform other validation techniques, such as to the content or values of the fields to determine any malicious content or potential attack to the server 240. After filtering or maintaining one or more fields in the message, the message modifier 228 can transmit the message to the server. In some cases, if various fields are removed from a message, subsequent fields (e.g., from fields coming from the same client device 208) may be combined to the message in queue for transmitting to the server 240, for example.

In some cases, the message modifier 228 can remove control characters from messages or fields of messages. For example, the message modifier 228 can determine, responsive to detecting control characters in a message or a field, that the message may be used to configure the server 240 or an application in the server 240. This may indicate that the message is a thread or include malicious intent. The message modifier 228 can remove the message or the field that includes these control characters. In another example, the message modifier 228 can determine to remove the fields having control characters based on the policy.

In some cases, based on at least one invalid, duplicated, unknown field, or other undesirable (e.g., potentially malicious) value within the fields, the message modifier 228 may remove the entire string of fields or the message. For example, the message modifier 228 can receive or be informed of a policy configured by the administrator of the server 240. The policy can include discarding messages with at least one of the objectionable categories, such as at least one of invalid, duplicated, unknown fields, or undesirable fields. Accordingly, after the detector 224 detects at least one objectionable field for the message modifier 228, the message modifier 228 can discard the message associated with the objectionable field. Removing duplicate fields can be referred to as removing inline duplicate from an inline proxy or a virtual proxy cloud service in a transaction path, for example.

By validating and performing checks (e.g., range checking on strings or repeated fields or parameter checking) on the messages, the device 216 can prevent attacks from reaching the endpoint (e.g., the server 240 or the client device 208). In some implementations, the device 216 can perform features and functionalities discussed above to transcode between compatible formats, such as between JSON and protocol buffer format. While transcoding, the device 216 can intercept messages in different formats to confirm the validity of the data shared or exchanged between endpoints to prevent attacks or exploitation of other's vulnerabilities. Further, with a custom configuration file (e.g., custom proto file options or annotation capabilities that is customized or configured by an administrator of a computing node or server 240), the device 216 can affect transparent inline extending of gRPC protocol to support novel encoding or transcoding of messages. For example, with any encoded or transcoded messages, the administrator of the server 240 can annotate or provide options as to parameters of the fields to accept or discard to accept new messages without having attack vectors. Additionally, by annotating proto file fields with custom options, the device 216 can generate transform classes of API parameters annotated by the options based on external events. For example, the device 216 can translate all localizable strings into different programming languages or restrict access to classes of fields based on Geo-Location. In this case, the device 216 can compare conditions of, for example, client device 208 to determine types or classes of fields restricted by the server 240, among other parameters configured by the administrator of the server 240.

The message modifier 228 can modify the message to conform with the server 240, e.g., maintain supported fields and remove fields including names or values not supported by the server 240. In some implementations, the message modifier 228 can mark the fields to be skipped or not to be processed by the server 240. Further, by removing redundant or unwanted fields and validating field content for known vulnerabilities, the device 216 can mitigate vulnerabilities of an Open Web Application Security Project ("OWASP") by removing fields harmful, unknown, or not supported by the server 240 that the message is directed to. By removing the one or more fields, the message modifier 228 can remove the attack vector to prevent hidden data from being processed by the server 240. By eliminating unnecessary or redundant fields, removing redundant and unnecessary fields, modifying non-compliant field values, or performing range check, the message modifier 228 can reduce the server load and throughput, and the servers 240 can be less vulnerable to overload by unknown fields or redundant fields. Furthermore, the message modifier 228 can modify non-compliant field values (e.g., values or sizes out of range) responsive to receipt of the messages, such as to be compliant by updating the conflicting values. For example, with field values out of range, the message modifier 228 can update the field values of the particular field to other non-restricted or non-reserved field values, such that the field can be transmitted to the server 240 without removing from consideration.

The device can include a database 232. The database 232 can be referred to as a storage device, a data repository, or a memory. The database 232 can be physical storage volumes and virtual storage volumes or arrays thereof. The database 232 can include, store, or maintain information received from the client device 208. The database 232 can store information received from the server 240. For example, the database 232 can store messages received from the client device 208 to be transmitted to the server 240 or messages received from the server 240 for forwarding to the client device 208. In some cases, the database 232 can store the messages temporarily, such that the messages will be removed from storage after transmitting the message to their intended destination. The database 232 can store information from devices connected to the database 232, such as source IP address, destination IP address, size of the message, fields in each message, etc.

The database 232 can include a policy storage 236. The policy storage 236 can store the policies for one or more components of the device 216 to enforce, such as on the messages sent from the client device 208. The stored policy can include at least those described hereinabove. The policy storage 236 can be accessed by an administrator of the server 240 to store additional policies, modify, or remove existing policies. The database 232 can store raw data (e.g., raw messages or fields received from either the client device 208 or the server 240) to be processed by one or more components of the device 216. The database 232 can store processed data from the message modifier 228. In some cases, the database 232 can store fields removed from the messages, such as invalid fields, unknown fields, duplicate fields, or undesired fields. These fields can be processed to determine the severity of the potential attack (if any) or if these fields should be passed to the intended destination server 240 for decoding. The database 232 can include, store, or maintain other data described hereinabove, such as the categorization of each field of messages, proto files or configuration files of client devices 208 or servers 240, or stub libraries from the server 240.

Referring now to FIGS. 3A-B, example illustrations of a message containing objectionable fields are shown, in accordance with an embodiment. The example features and functionalities described herein can be executed, performed, or otherwise carried out by one or more components of the system 200 (e.g., client device(s) 208, device 216, or servers 240), the computer 100, or any other computing devices described herein in conjunction with FIGS. 1A-B and FIG. 2.

Referring now to FIG. 3A, the message 300A can have duplicate fields 304A-N (sometimes referred to as field(s) 304). The message can originate or be transmitted from a client device. For example, the client device can transmit the message 300A designated to a server. During transmission, a device (e.g., device 216 intermediate between client devices 208 and servers 240) can intercept the message for processing. The device can detect that one or more fields in the message 300A are duplicates. The device can translate the message 300A containing duplicates, into a message without duplicates, such as an output message 308. For example, the message 300A can include multiple duplicated fields 304. The device select the last of the duplicated field to generate an output message 308 for the server. In some cases, the output message 308 can be the message 300A removed of all other duplicated fields except for the last duplicate field. For example, if the message 300A includes fields 304A-C, the device can remove fields 304A-B that are duplicates of 304C, and transmit message 308 including field 304C. Based on the policy of this case, other duplicated fields 304 can be removed from the message 300A or the last field of the duplicates can be selected and output as message 308.

The device can perform other operations to duplicated fields based on the policy. For example, the device can determine that duplicated fields 304 do not include similar values. In this case, the device can concatenate or combine the values of the duplicated fields 304. Accordingly, the device can generate message 308 having a field that is not duplicate of other fields with concatenated values in the name-value pairs. In some cases, if the policy indicates to discard messages having duplicate fields (e.g., fields 340), the device can discard message 300A based on this policy. In some cases, the policy can indicate to discard the message 300A after exceeding a number (e.g., 5, 10, etc.) of duplicate fields.

Referring now to FIG. 3B, a message 300B and an output message 328 are depicted. The message 300B can include fields 312, 316, 320, and 324. The device can detect the types of fields included in the message 300B. For example, the device can detect that field 312 (e.g., a second field) is an invalid field, field 316 (e.g., a first field) is a valid field, field 320 (e.g., a fourth field) is an unknown field, and field 324 (e.g., a third field) is an undesired field. The field order as shown in message 300B can be flexible or can be arranged in any order. In this, invalid, unknown, undesired, or other objectionable fields can be interleaved with one or more valid fields, such as the first field in this case. The device can transform the message 300B into a form containing no invalid, unknown, or undesired fields, such as in message 328 having at least the valid first field from the message 300B. The device can remove one or more objectionable fields based on the policy. For example, the device can determine the field values, field ranges, field numbers, among other field parameters indicated or configured by the administrator of the server. The policies can be based on information of proto files or stub libraries from the server, for example. Once objectionable fields are removed or the device generated a new message with valid fields, the device can transmit a modified message (e.g., message 328) to the server.

In some cases, the policy can indicate for the device to discard the message 300B based on certain types of objectionable fields, the number of objectionable fields (at least of certain types), or the number of different types of objectionable fields. For instance, the device can retrieve policies from a database, indicating one or more conditions to discard a message (e.g., message 300B). The policy can indicate for the device to discard the message 300B with an invalid field, unknown field, undesired field, or at least a pair of duplicate fields. The policy can indicate for the device to discard the message 300B having a number of objectionable fields, such as two, three, among other numbers of the same or different types. For example, with message 300B having three objectionable fields, the device may discard message 300B according to this policy. The policy can indicate for the device to discard the message 300B having at least one type or multiple types of objectionable fields. For example, the device can determine that only one type of objectionable field is included in the message (e.g., message 300A). The device can modify but not discard the message if the policy indicates a threshold of 2 types. However, if the device detects 3 types of different objectionable fields (e.g., message 300B), the device can discard this message.

Figure 4:
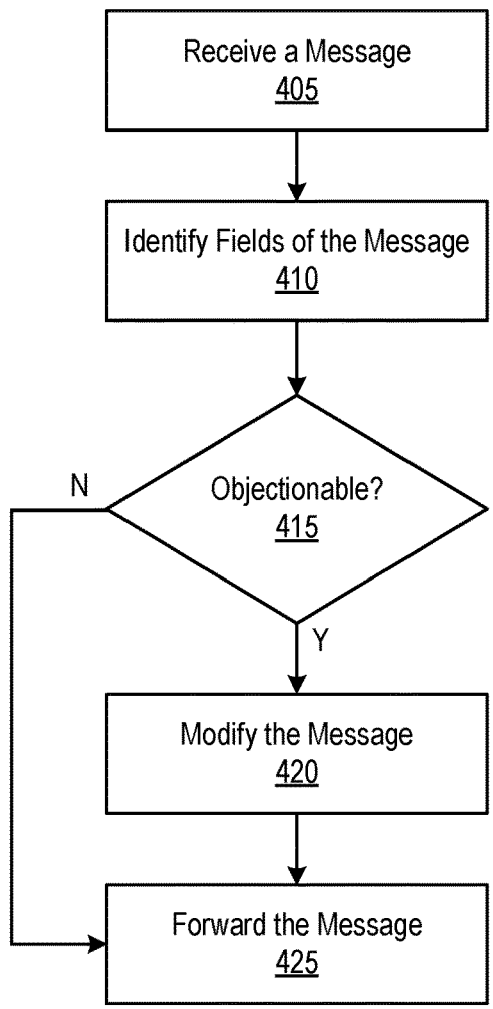
FIG. 4 is a flow diagram of a method for reducing vulnerability to nodes of a computing environment, in accordance with an embodiment.

Referring now to FIG. 4, depicted is a flow diagram of a method for reducing vulnerability to end or other network nodes (e.g., servers), in accordance with an embodiment. The example method 400 can be executed, performed, or otherwise carried out by one or more components of the system 200 (e.g., client devices 208, device 216, or servers 240), the computer 100, or any other computing devices described herein in conjunction with FIGS. 1A-B. In brief overview, the method 400 can include a device receiving a message, at step 405. At step 410, the device can identify one or more fields of the message. At step 415, the device can determine if the one or more fields are objectionable. At step 420, the device can modify the message. At step 425, the device can forward the message.

In further detail, a device (e.g., device 216) can receive a message from a client (e.g., client device) with various fields to execute one or more routines on the a network node (e.g., a server) remote from the client, at step 405. The device can be an intermediary between the client and the server. For example, the client can execute an application (e.g., web browser, email application, local application, virtual application, among others) to establish a communication channel to the server. The device can intercept and receive the message from the client transmitting the message via the application. The message can correspond to a gRPC protocol, where the client can be a gRPC client (e.g., RPC or gRPC based client), and the server can be a gRPC server (e.g., RPC or gRPC based server).

The features and functionalities of receiving, processing, and transmitting a message to an end node (e.g., a device on the other side of the transmission line), can be performed bidirectionally by the device. For example, the device can receive messages from clients, process the messages, and transmit the messages to servers. Similarly, the device can receive messages from the servers, process this message, and transmit the message to the clients. By processing messages from the clients, the device can reduce vulnerability to the end or other network node (e.g., removing potential attack vectors and malicious messages), increase the performance of the server (e.g., reducing server load and throughput), and improve the latency of that node (e.g., reduce unnecessary data to be processed).

At step 410, the device can identify various fields of the message. Individual fields can be processed by the server to execute one or more routines, tasks, or instructions (e.g., including responding to the client) on the server. The device can detect at least one of the fields that exploits a vulnerability of the server. For example, the device can detect at least a field of the fields in the message intended to exploit the backward and forward compatibility of a server. Due to the backward and forward compatibility, the server may be configured to accept messages (e.g., gRPC messages) with unknown field numbers. In this case, the server would process these fields before any validation of whether the fields are supported, which could leave the server vulnerable to DoS or injection attacks. In another example, the device can detect at least a field in the message intended to exploit the flexibility of the fields (e.g., placing hidden fields or objectionable fields next to valid fields in messages potentially for injection attacks), or lack of field validation (e.g., lacks range checking or string content validation, such that max size values for all parameters are accepted) on the server. With these vulnerabilities, the server may be prone to attacks. The device can identify the fields of the message for modification to remove harmful fields, thereby reducing vulnerability to the server and increase the performance of the server.

For example, the device can identify duplicate fields from the message. The duplicate fields in the plurality of fields can be indicative of an attack on the server that reduces the server performance. The device can identify and remove or concatenate duplicate fields based on multiples fields having the same field number.

The device can receive a configuration file used by the network node to process the message. The device can identify parameters or policies within annotated within the configuration file configured by the administrator of that node. For example, the configuration file can indicate at least field values, field ranges, field types, field numbers, among other parameters of the fields supported or valid for a server. In some cases, the configuration file can include one or more excluded parameters, such as parameters not accepted by the server or to be discarded by the device. The device can use the configuration file to determine one or more details or information of the message to detect, such as field numbers included in the message, the values of each field, etc. The device can determine one or more objectionable fields based on the configuration file. For example, the configuration field can include (or not include) information or parameters indicating that a field is invalid, unknown, undesired, or duplicate of other fields. The device can use the configuration file to determine how to modify the content (e.g., fields) of messages.

The device can detect that the field is unknown (e.g., unknown field) in accordance with the RPC protocol used by the network node. The field can be unknown, for example, if the field number is outside the range of unique numbers used for the server to identify the fields in message binary format. In some cases, the field can be unknown if the field value is not described in the proto or other configuration file. For example, the device can identify a field number of a message associated with a field value. When comparing to the proto file of the network node, the device can determine that the field number in the proto buffer message, is not found in the .proto file. In this case, the device can determine that the field is unknown, and for the field to be modified.

In some cases, the device can detect a custom field type. The device can perform a look-up of the field type in the configuration file of the network node. If the field type is not described in the configuration file or the information detected in the custom field type does not compare to the information in the configuration file, the device can determine that the field is unknown. The device can classify other fields having undefined name-value pair(s) as unknown, for example. In some implementations, field values can refer to field numbers, while in other implementations, the field values can refer to the values of the name-value pairs of a field (e.g., values of the field).

The device can detect that the field is unacceptable (e.g., undesired field) by one of the device or the network node (e.g., a server). For example, the device can identify the policies, valid parameters, or undesired parameters indicated in the configuration file. The device can detect the parameters of one or more fields, such as the field numbers, the range of the field number, or the field types. The device can compare the parameters of the field to the policies or options annotated in the configuration file provided by the server. The policies can indicate at least one field number, at least a field range, or at least a field type to exclude from acceptance. By comparing the information of individual fields to these policies, the device can detect one or more fields of various messages that are unacceptable for transmission to the device or the server.

The device can detect that the field is invalid based on a non-conformance with a configuration file used by the network node to process the message. For example, the configuration file can indicate one or more field numbers to be accepted as valid fields from messages. The device can detect the field numbers from the message, and compare the detected field numbers to the valid fields in the configuration file. If one or more field numbers from the message matched the valid fields, the device can determine that the associated fields are valid. Otherwise, if the field number does not match any of the valid field numbers (e.g., field allocated for use by the server or operation of the server), the device can determine that the field is invalid.

In some cases, the device can detect if the field numbers fall within at least a range of reserved field numbers, such as field values not used by the server or used by other servers. If the field number is within these reserved ranges (e.g., 19000 through 19999 reserved for protocol buffer implementation), or other custom ranges configured by the administrator of the network node, the device can determine that the field numbers are invalid. In some cases, the device can check for the size of individual fields compared to their field type. The configuration file can limit the size of individual fields type to a threshold. If the field size is greater than the threshold of their corresponding field type, the device can determine that the field is invalid. For example, the configuration file can limit the size (or length) of the enum-typed field to 5 bytes and the message-typed field to 10 bytes. In this case, if a message from a client includes at least one of an enum-typed field greater than the 5 bytes or the message-typed field greater than 10 bytes, the device can determine that at least one of these fields is invalid.

Further, the configuration file can indicate a size threshold for messages or messages having certain field types. For example, the configuration file can indicate a size limit of messages to be accepted. The device can detect the size of the message and determine if the size exceeds the size threshold. Based on whether the size of the message exceeds the threshold, the device may or may not transmit the message to the server. In some cases, the device can split the message into different chunks prior to transmitting multiple chunks to the server. In some cases, the device can determine the maximum allowable size for the message based on the detected field types in the message. Therefore, the device can detect the size of the message or individual fields to determine the validity of the message, where the device can detect invalid fields or messages for subsequent removal (e.g., removing invalid fields from the message) or exclusion (e.g., exclude one or more fields from being included in the newly generated message for transmitting the server).

At step 415, the device can determine if there is an objectionable field in the message. The objectionable field can include duplicate fields, invalid fields, unknown fields, undesired fields, among others. The device can determine any objectionable field included in the message based on the identification or detection of the fields. For example, the device can determine that at least one objectionable field (e.g., invalid field, unknown field, duplicate fields, undesired fields, etc.) is included in the message, such as by analyzing the field name, field value, content of the message, among elements of the message. The device can proceed to step 420 to modify the content of the message, such as maintaining one or more fields, removing at least one field, replacing at least one field, concatenating fields, generating a new message with a subset of fields from the input message (e.g., original message received from the client device), or discarding the message per policy indicated in the configuration file. If no objectionable field is detected in the message, the device can proceed to step 425 to forward the message received from the client to the server (or the designated device) without modifying the content of the message.

At step 420, the device can modify at least one of the fields of the message from the client instead of the network node (e.g., a server) modifying the message. By modifying the message, the device can improve node performance based at least on the identification of one or more objectionable fields. The device can modify the message in accordance with the configuration file (e.g., indicating policies or options configured by an administrator of the server) prior to forwarding the message to the network node. For example, the configuration file can be annotated to indicate parameters (e.g., custom range, value, number, size, or the types) of the fields supported, accepted, or rejected (e.g., not desired) by the node. The annotation can be configured by the administrator of the node. In some cases, if the message is from the network node, the device can receive a configuration file of a client indicating the parameters of the fields supported, accepted, or not accepted by the client. In some cases, the configuration file can be provided by an administrator of an application executing on the client device to communicate with the server. In some other cases, the configuration file can be the same as a configuration file shared from the server.

The device can modify messages with duplicated fields. For example, the device can determine and select the last duplicate field in the message for generating a new message (e.g., a second message) with all objectionable fields removed. The new message can include the last duplicated field and other valid fields selected from the message from the client (e.g., a first message or a source message). In some cases, selecting or using the last duplicate field can include modifying a value of at least one of the duplicated fields to a value of the last duplicated field in the message. In another example, the device can determine that the values (e.g., the value of the name-value pair) of the duplicated fields are not the same. The device can modify a value of at least one of the duplicate fields (e.g., first duplicate, last duplicate, or other duplicates in between) to include a concatenation of values of other duplicate fields. The concatenated values can be non-duplicates of the values from the duplicate fields, for example.

In some cases, the device can remove or concatenate values of duplicate fields based at least on the type of field. For example, for certain types of fields (e.g., which can be based on the policy), the device can remove the duplicate field and modify a remaining field corresponding to the duplicate field (e.g., the remainder of the duplicate field) to have a value equal to a value of one of the duplicate field or the remaining field that is last in order in the message. For instance, the device can modify the remaining field to include a value of the last duplicate field or a value of at least one of the duplicate fields. In further example, for other types of fields, the device can remove the duplicate field(s) and modify a remaining field (e.g., which may or may not be the last duplicate) corresponding to the duplicate field to have a concatenation of values of the duplicate field(s) and the remaining field. In this case, the device can combine the values of the duplicates or add the values of other duplicate fields to a single (e.g., remaining) field. Therefore, the device can modify the message to remove duplicated fields from the message.

The device can modify the message having other objectionable fields, including but not limited to invalid, unknown, or undesired fields. Based on at least the field type, the classification of the objectionable fields, or the annotation of the configuration file, the device can determine to remove or modify the fields or discard the message based on the preference of the administrator. For example, the device can remove a field of various fields, including a corresponding value of the field, from the message based on the value of the field (e.g., string length, size of the field, etc.) exceeding a range established for the field type (e.g., a first field type). In another example, with a second field type different from the first field type, if the value of the field exceeds the range, the device can discard the message having this field with the second type. In this case, the device may have classified the field as invalid. The device can remove other invalid fields from the message or generate a new message without the detected invalid fields.

In some cases, one of the field numbers of the identified message may be directed to a reserved number or falls within a range of reserved numbers. The reserved numbers may be restricted from being called by the client, for example. The device can analyze the values of the field to determine if the field includes valid values, attack vectors, malicious intent, or junk for the network node. If the field includes valid values (e.g., values for the server to perform one or more routines), the device can modify the field number to a valid number (e.g., within range limits or non-reserved numbers), such that the field can be included in the message for sending to the server.

The device can remove unknown fields, undesired fields, among other objectionable fields similar to the above example, such as based on the field type, the classification of the objectionable fields, or the configuration file. For example, based on the configuration file, the device can determine that a field includes an associated field number, size, or values of the field to be excluded. The device can remove this field from the message. In some cases, the device can generate a new message to include valid fields detected from the message or fields other than the objectionable field(s).

In some cases, the device can enforce a policy by discarding a message with at least one or a combination of types of objectionable fields indicated by the policy. For example, the policy can indicate to discard messages with at least one of unknown field or undesired field. If the device detected either an unknown field or an undesired field, the device can discard the message including the field. The device can modify the message with other objectionable fields. Similarly, the policy can indicate for the device to discard messages having one or more combinations of types of objectionable fields (e.g., a combination of duplicate and invalid, unknown and undesired, etc.). In further example, the policy can indicate to discard messages with a number of objectionable fields exceeding a threshold (e.g., either specific types of objectionable fields or any objectionable fields). The device can discard the message having a number of objectionable fields exceeding the threshold (e.g., 5, 10, 15, etc.) configured by the administrator of the server.

At step 425, the device can forward the message to the network node (e.g., a server). The message can be a modified message, removing all fields that are objectionable as detected and modified by the device based at least on the configuration file, policies, or options. If the message was not modified, the device can forward the message received from either the client or the server to the designated endpoint. Accordingly, the device can process messages for forwarding to the network node (or the client) for reducing vulnerability, improving performance, preventing overloading, reducing latency, and preventing attacks from entities transmitting the message.

Figure 5:
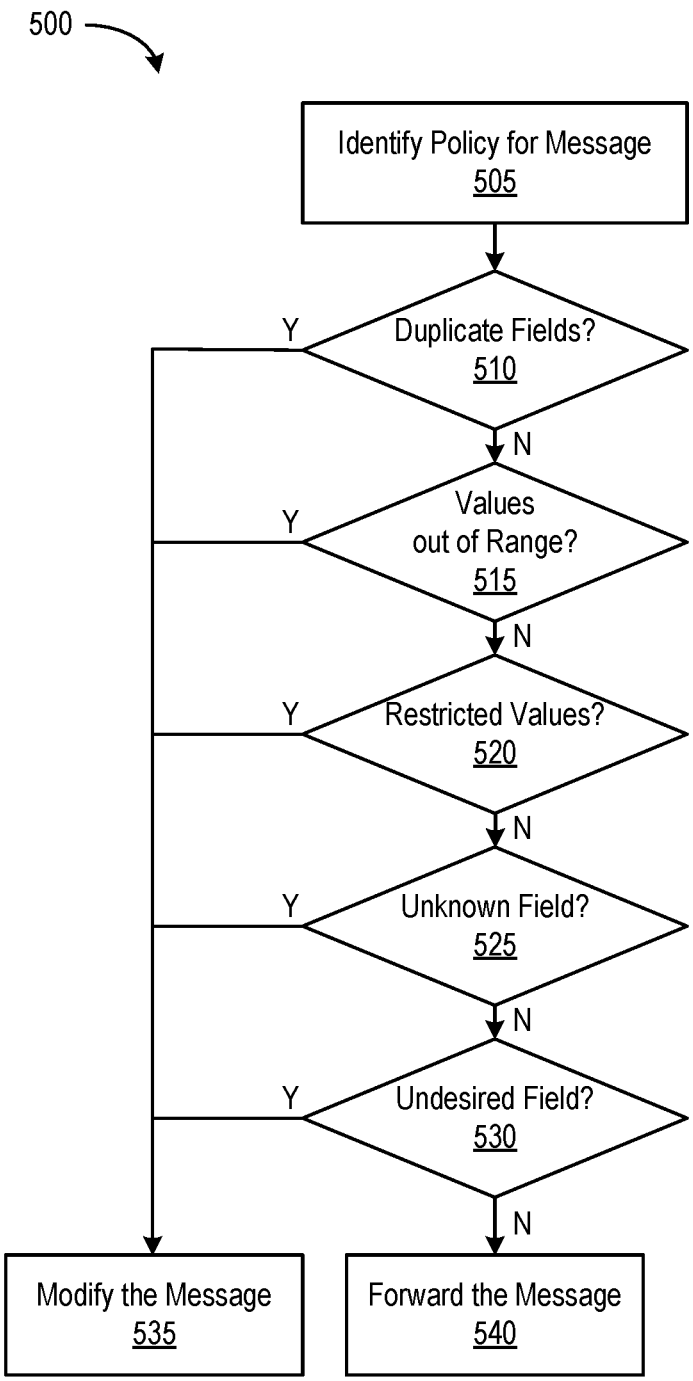
FIG. 5 is a flow diagram of a method for detecting objectionable fields, in accordance with an embodiment.

Referring to FIG. 5, depicted is a flow diagram of a method for detecting objectionable fields, in accordance with an embodiment. The example method 500 can be executed, performed, or otherwise carried out by one or more components of the system 200 (e.g., client devices 208, device 216, or servers 240), the computer 100, or any other computing devices described herein in conjunction with FIGS. 1A-B. The method 500 can include a device (e.g., a detector of the device intermediary to client devices and computing nodes) identifying a policy for a message (or messages), at step 505. The device can retrieve the policy from one or more servers (e.g., computing nodes or network nodes) and store the policy within a database (e.g., the memory of the device). The policy can be associated with individual servers. For example, the policy can indicate fields that are valid, accepted, or otherwise supported by a respective server. In some cases, the policy can indicate invalid, unsupported, or unwanted fields that the device can modify, remove, or filter out. The policy can indicate what to analyze in the message to determine whether one or more fields are objectionable, such as checking or comparing field values (or numbers), the content of the field (e.g., field description or values of the field), field name, field type, among others. Based on the policy, the device can determine if a message includes at least one objectionable field as described herein.

At step 510, the device can determine if one or more fields within the message are duplicates. For example, the device can compare the fields in a message to identify any field values, fields names, or content of the fields that are duplicates of another field in the message. The device can compare the field types between individual fields to identify any duplicates. In some cases, the device can determine that fields are duplicates if the name or field numbers are matched. If the device identifies any duplicate, the device can proceed to modify the message or the field of the message (e.g., proceed to step 535). At step 515, the device can determine if a field value is out of range. For example, the device can identify the field value of individual fields in the message. Identifying the field (e.g., value, name, content, etc.) can refer to detecting the field. The device can compare field values in the message to an allowable range of field values (e.g., between 1 and $2^{29}$). The allowable range can be indicated in the policy stored in the database of the device. If a field value falls outside the allowable range, the device can determine that the field value is out of range. The device can proceed to step 535 to modify the message.

At step 520, the device can determine if a field value is restricted (e.g., reserved or occupied by another field with a different description). For example, the device can identify reserved or restricted field values (e.g., range of field values that are reserved) based on the policy. Field values can be reserved for specific functions, which the client device may not access or does not have permission to access (e.g., protocol buffers implementations occupying field numbers 19000 through 19999). The device can identify field values of individual fields in the message. The device can compare the field values to a range of reserved field values. If at least one field value of the message matched a reserved field value, the device can proceed to step 535.

At step 525, the device can determine if a field is unknown in a message. For example, the device can identify or detect a field value, field content, field description, or other elements of the field. The device can perform a lookup into a stub library (e.g., configuration file) to search for the field. The device can determine or identify if the field is present in the configuration file. The device can look for the field number, field description, among other elements of the field to determine if the field is supported by the designated server (e.g., computing node). If the field is absent from the configuration file, the device can proceed to step 535.

At step 530, the device can determine if a field is undesirable in a message. For example, the device can identify, based on the policy (or the configuration file configured by an administrator of a respective computing node), one or more fields undesired by the server (e.g., computing node). The undesired field can be indicated by the field number, the content of the field, among other elements of the field indicated by the policy or in the configuration file. The device can detect any undesired fields while analyzing individual fields of the message. If the device identifies undesired fields, the device can proceed to step 535.

The device can identify or determine the type of objectionable field (if any) without any particular order (e.g., analyzing individual fields to determine if any are objectionable). In some cases, the device can go through or perform a checklist of potential objections (e.g., duplicate, invalid, undesired, etc.) for each field to determine whether the field matched an objectionable type. In some cases, the device can determine that the message does not contain any objectionable fields. In this case, the device can proceed to step 540.

At step 535, the device can modify the message by having one or more objectionable fields. The device can modify the message based on the type of objectionable field included in the message. In some cases, modifying the message can refer to removing objectionable fields or discarding the message based on the policy. For example, the device can refer to the policy (or the configuration file configured by an administrator of a computing node) to determine whether to remove the field, modify or edit the field, or discard the message containing the objectionable field altogether. The device can modify the message based on the preference of the administrator of the computing node (e.g., server or network node). The process to modify the message can be described in further detail, for example, in at least FIG. 4 and FIG. 6.

At step 540, the device can forward the message to a computing node indicated in the destination address of the message. For example, the device may not identify any objectionable fields based on the policy or the configuration file. The device can determine that the field numbers, the content of the fields, among other elements or components of the fields in the message are supported, accepted, or valid for the designated computing node. Accordingly, the device can forward the message as received from the client device to the computing node.

Figure 6:
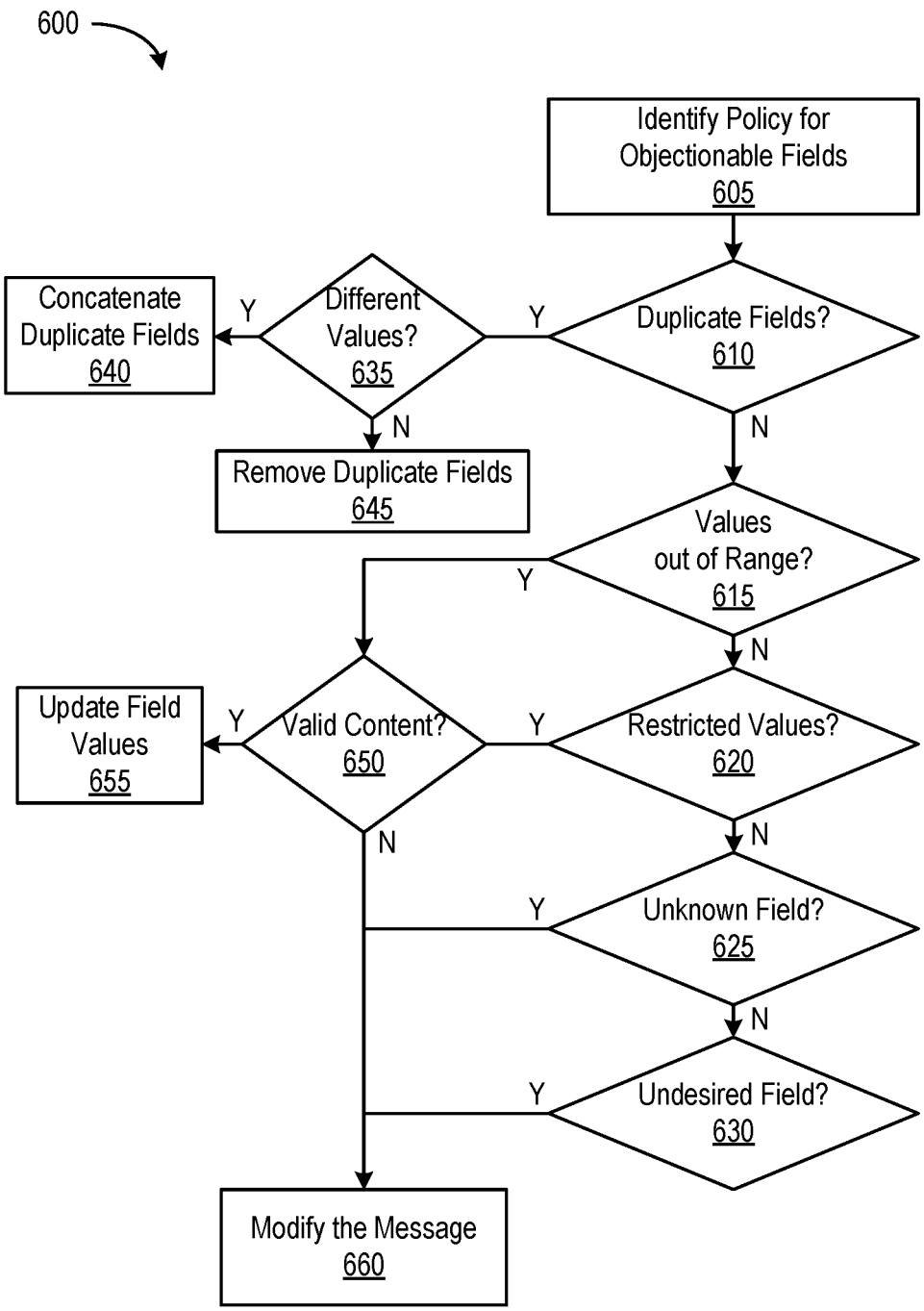
FIG. 6 is a flow diagram of a method for modifying a message, in accordance with an embodiment.

Referring to FIG. 6, depicted is a flow diagram of a method for modifying a message, in accordance with an embodiment. The example method 600 can be executed, performed, or otherwise carried out by one or more components of the system 200 (e.g., client devices 208, device 216, or servers 240), the computer 100, or any other computing devices described herein in conjunction with FIGS. 1A-B. The method 600 can include a device identifying a policy for objectionable fields, at step 605. The device may identify that one or more fields within a message are objectionable. For example, the device can determine that the message includes duplicate fields (610), field values that are out of range (615), fields with restricted fields values (620), at least one unknown field (625), or at least one undesired field (630). Based on the policy for individual types of objectionable fields, the device can modify, remove, or otherwise replace the field (or message) accordingly.

At step 610, the device can determine that there are duplicate fields in the message. The device can determine that the field numbers of multiple fields are the same. The device can determine if the values or content of the fields are different (635). If the values of the duplicate fields are the same (e.g., similar content or definition of the field called by the client device), the device can remove the duplicate fields (645). Removing duplicate fields can refer to selecting the last of the duplicate fields and generating a second message including the last of the duplicate fields and other valid fields in the message for transmission to a computing node (e.g., server). In some cases, removing the duplicate fields can refer to discarding other duplicate fields (e.g., keeping one of the duplicate fields in the message). If the values of the fields are different (e.g., different content or definition in the field), the device can concatenate the duplicate fields (640). Concatenating the duplicate fields can refer to combining or adding different values or non-duplicate values from duplicate fields to generate a concatenated field in the message. The message can be free of or not include duplicate fields by either concatenating or removing the duplicates.

At step 615, if the device determines that the field values are out of range, the device can determine if the content of the field is valid (650). The validity of the content can be based on the configuration file. For example, the device can compare fields in the message with field values, field definitions, among other elements of the fields in the configuration file. If the field includes valid content (e.g., field definition is supported by the configuration file), the device can update the field values (655). Updating the field values can include changing the field values that are out of range to field values that are valid (e.g., within the permitted range indicated by the configuration file configured by the administrator of the computing node). If the field does not include valid content or description (e.g., indicated by the configuration file), the device can proceed to step 660.

At step 620, if the field values in the message overlap with restricted or reserved values (e.g., used for other functions), the device can proceed to determine if the content of the field is valid (650). Similar to the above, if the content is valid (e.g., based on the definition of the field described in the configuration file), the device can update the field values to be within the permitted range of field values without overlapping reserved field values. If the field does not include valid content or description (e.g., indicated by the configuration file), the device can proceed to step 660.

At steps 625 and 630, if the device determines that the field is unknown or undesirable, the device can proceed to step 660. The device can modify the message with fields that are unknown, undesirable, or invalid (e.g., invalid field values without valid content), for example. Modifying the message can refer to removing one or more objectionable fields in the message, selecting non-objectionable fields to generate a second message for forwarding to a computing node, or discarding the message having an objectionable field (e.g., at least a type of objectionable field or a number of objectionable fields). The device can modify the message based on the policy stored in the database of the device. For example, the device can remove the objectionable field from the message. The device can select non-objectionable fields to generate a new message for forwarding to the computing node. The device can discard the message based on the policy indicating to discard the message having at least a type or combination of types of objectionable fields (e.g., duplicate fields, invalid fields, unknown fields, or undesired fields). In some cases, the device can modify the message by replacing objectionable fields (e.g., invalid field numbers with valid content) with a field including a valid field number and valid field content, for example. The replaced field with a new field number can include the same field content as the original field from the message (e.g., as sent by the client device). Once all objectionable fields are removed or modified, the device can transmit the message to the designated computing node. Otherwise, based on the policy, the device may discard the message and may notify the client device of the transmission failure or blocked message.

FURTHER EXAMPLE EMBODIMENTS

The following examples pertain to further embodiments, from which numerous permutations and configurations will be apparent.

Example 1 includes a method including: receiving, by a device intermediary to a client and a server, a message from the client with a plurality of fields to execute one or more routines on the server remote from the client; identifying, by the device, duplicate fields in the plurality of fields that reduce server performance; modifying, by the device instead of the server, the plurality of fields of the message to improve the server performance based at least on the identification of the duplicate fields; and forwarding, by the device, the modified message to the server.

Example 2 includes the subject matter of Example 1, further wherein the duplicate fields in the plurality of fields are indicative of an attack on the server that reduces the server performance.

Example 3 includes the subject matter of any one of Examples 1 and 2, further comprising modifying, by the device based at least on a type of field, a value of the field to a concatenation of values of the duplicate fields.

Example 4 includes the subject matter of any one of Examples 1 through 3, further comprising modifying, by the device based at least on a type of field, a value of the field to a value of a last duplicated field in the message.

Example 5 includes the subject matter of any one of Examples 1 through 4, further comprising removing, by the device, a field of the plurality of fields and a corresponding value of the field based on the value of the field exceeding a range established for a type of field corresponding to the field.

Example 6 includes the subject matter of any one of Examples 1-5, further comprising: receiving, by the device, a configuration file used by the server to process the message; and modifying, by the device, the message in accordance with the configuration file prior to forwarding the message to the server.

Example 7 includes the subject matter of any one of Examples 1-6 wherein the message corresponds to a gRPC protocol, the client is a gRPC client, and the server is a gRPC server.

Example 8 includes a method including: receiving, by a device intermediary to a client and a server, a message from the client with a plurality of fields to execute one or more routines on the server; detecting, by the device, a field of the plurality of fields that exploits a vulnerability of the server; modifying, by the device instead of the server and responsive to the detection, the message to remove the field to enable reduction of the vulnerability to the server; and forwarding, by the device, the modified message to the server.

Example 9 includes the subject matter of Example 8, further comprising: detecting, by the device, that the field exposes the vulnerability in accordance with an RPC protocol used by the server; and detecting, by the device, that the field is unknown in accordance with the RPC protocol used by the server.

Example 10 includes the subject matter of any one of Examples 8 and 9, further comprising: detecting, by the device, that the field is unacceptable by one of the device or the server.

Example 11 includes the subject matter of any one of Examples 8-10, further comprising: forwarding, by the device to the server, the message with all fields that are objectionable removed.

Example 12 includes the subject matter of any one of Examples 8-11, further comprising: detecting, by the device, the field is invalid based on a non-conformance with a configuration file used by the server to process the message.

Example 13 includes the subject matter of any one of Examples 8-12, wherein the RPC protocol is gRPC, the client is a gRPC client, and the server is a gRPC server.

Example 14 includes a system including: a device intermediary to a remote procedure call (RPC) based client and a RPC based server, the device configured to: intercept a RPC message from the RPC based client to the RPC based server, the RPC message having a plurality of fields to execute one or more routines on the server; detect that one or more fields of the plurality of fields exploits a vulnerability of the RPC based server; modify the RPC message to remove the one or more fields from the RPC message; and forward the modified RPC message to the RPC server.

Example 15 includes the subject matter of Example 14, wherein the device is further configured to detect that the one or more fields comprise a duplicate field.

Example 16 includes the subject matter of any one of Examples 14 and 15, wherein the device is further configured to remove the duplicate field and modify a remaining field corresponding to the duplicate field to have a concatenation of values of the duplicate field and the remaining field.

Example 17 includes the subject matter of any one of Examples 14 through 16, wherein the device is further configured to remove the duplicate field and modify a remaining field corresponding to the duplicate field to have a value equal to a value of one of the duplicate field or the remaining field that is last in order in the RPC message.

Example 18 includes the subject matter of any one of Examples 14 through 17, wherein the device is further configured to detect that the one or more fields is invalid or unknown in accordance with the RPC protocol used by the RPC based server.

Example 19 includes the subject matter of any one of Examples 14 through 18, wherein the device is further configured to remove the one or more fields from the RPC message.

Example 20 includes the subject matter of any one of Examples 14 through 19, wherein the device is further configured to detect that the one or more fields is unacceptable to one of the device or the RPC based server and remove the one or more fields from the RPC message.

Various elements, which are described herein in the context of one or more embodiments, may be provided separately or in any suitable subcombination. For example, the processes described herein may be implemented in hardware, software, or a combination thereof. Further, the processes described herein are not limited to the specific embodiments described. For example, the processes described herein are not limited to the specific processing order described herein and, rather, process blocks may be re-ordered, combined, removed, or performed in parallel or in serial, as necessary, to achieve the results set forth herein.

It should be understood that the systems described above may provide multiple ones of any or each of those components and these components may be provided on either a standalone machine or, in some embodiments, on multiple machines in a distributed system. The systems and methods described above may be implemented as a method, apparatus or article of manufacture using programming and/or engineering techniques to produce software, firmware, hardware, or any combination thereof. In addition, the systems and methods described above may be provided as one or more computer-readable programs embodied on or in one or more articles of manufacture. The term "article of manufacture" as used herein is intended to encompass code or logic accessible from and embedded in one or more computer-readable devices, firmware, programmable logic, memory devices (e.g., EEPROMs, ROMs, PROMs, RAMs, SRAMs, etc.), hardware (e.g., integrated circuit chip, Field Programmable Gate Array (FPGA), Application Specific Integrated Circuit (ASIC), etc.), electronic devices, a computer readable non-volatile storage unit (e.g., CD-ROM, USB Flash memory, hard disk drive, etc.). The article of manufacture may be accessible from a file server providing access to the computer-readable programs via a network transmission line, wireless transmission media, signals propagating through space, radio waves, infrared signals, etc. The article of manufacture may be a flash memory card or a magnetic tape. The article of manufacture includes hardware logic as well as software or programmable code embedded in a computer readable medium that is executed by a processor. In general, the computer-readable programs may be implemented in any programming language, such as LISP, PERL, C, C++, C#, PROLOG, or in any byte code language such as JAVA. The software programs may be stored on or in one or more articles of manufacture as object code.

While various embodiments of the methods and systems have been described, these embodiments are illustrative and in no way limit the scope of the described methods or systems. Those having skill in the relevant art can effect changes to form and details of the described methods and systems without departing from the broadest scope of the described methods and systems. Thus, the scope of the methods and systems described herein should not be limited by any of the illustrative embodiments and should be defined in accordance with the accompanying claims and their equivalents.

What is claimed is:

1. A method, comprising:
    receiving, by a device intermediary to a client and a server, a message from the client with a plurality of fields to execute one or more routines on the server remote from the client;
    identifying, by the device, duplicate fields in the plurality of fields of the message from the client that, upon execution, reduce server performance;
    modifying, by the device instead of the server, the plurality of fields of the message to improve the server performance based at least on the identification of the duplicate fields; and
    forwarding, by the device, the modified message to the server.

2. The method of claim 1, wherein the duplicate fields in the plurality of fields are indicative of an attack on the server that reduces the server performance.

3. The method of claim 1, further comprising modifying, by the device based at least on a type of field, a value of the field to a concatenation of values of the duplicate fields.

4. The method of claim 1, further comprising modifying, by the device based at least on a type of field, a value of the field to a value of a last duplicated field in the message.

5. The method of claim 1, further comprising removing, by the device, a field of the plurality of fields and a corresponding value of the field based on the value of the field exceeding a range established for a type of field corresponding to the field.

6. The method of claim 1, further comprising:
    receiving, by the device, a configuration file used by the server to process the message; and
    modifying, by the device, the message in accordance with the configuration file prior to forwarding the message to the server.

7. The method of claim 1, wherein the message corresponds to a gRPC protocol, the client is a gRPC client, and the server is a gRPC server.

8. A method, comprising:
    receiving, by a device intermediary to a client and a server, a message from the client with a plurality of fields to execute one or more routines on the server;
    detecting, by the device, a field of the plurality of fields of the message from the client as being duplicative and, upon execution, exploits a vulnerability of the server;
    modifying, by the device instead of the server and responsive to the detection, the message to remove the field to enable reduction of the vulnerability to the server; and
    forwarding, by the device, the modified message to the server.

9. The method of claim 8, further comprising:
    detecting, by the device, that the field exposes the vulnerability in accordance with an RPC protocol used by the server; and
    detecting, by the device, that the field is unknown in accordance with the RPC protocol used by the server.

10. The method of claim 8, further comprising detecting, by the device, that the field is unacceptable by one of the device or the server.

11. The method of claim 8, further comprising forwarding, by the device to the server, the message with all fields that are objectionable removed.

12. The method of claim 8, further comprising detecting, by the device, the field is invalid based on a non-conformance with a configuration file used by the server to process the message.

13. The method of claim 8, wherein the message is in accordance with a gRPC protocol, the client is a gRPC client, and the server is a gRPC server.

14. A system, comprising:
    a device intermediary to a remote procedure call (RPC) based client and a RPC based server, the device configured to:
    intercept a RPC message from the RPC based client to the RPC based server, the RPC message having a plurality of fields to execute one or more routines on the server;
    detect that one or more fields of the plurality of fields of the RPC message from the RPC based client to the RPC based server exploits, upon execution, a vulnerability of the RPC based server;
    modify the RPC message to remove the one or more fields from the RPC message; and
    forward the modified RPC message to the RPC server.

15. The system of claim 14, wherein the device is further configured to detect that the one or more fields comprise a duplicate field.

16. The system of claim 15, wherein the device is further configured to remove the duplicate field and modify a remaining field corresponding to the duplicate field to have a concatenation of values of the duplicate field and the remaining field.

17. The system of claim 15, wherein the device is further configured to remove the duplicate field and modify a remaining field corresponding to the duplicate field to have a value equal to a value of one of the duplicate field or the remaining field that is last in order in the RPC message.

18. The system of claim 14, wherein the device is further configured to detect that the one or more fields is invalid or unknown in accordance with the RPC protocol used by the RPC based server.

19. The system of claim 14, wherein the device is further configured to remove the one or more fields from the RPC message.

20. The system of claim 14, wherein the device is further configured to detect that the one or more fields is unacceptable to one of the device or the RPC based server and remove the one or more fields from the RPC message.

* * * * *